United States Patent
Kurematsu et al.

(10) Patent No.: US 8,926,460 B2
(45) Date of Patent: Jan. 6, 2015

(54) RATCHET-TYPE TENSIONER

(75) Inventors: Yuji Kurematsu, Osaka (JP); Munehiro Maeda, Osaka (JP); Osamu Yoshida, Osaka (JP); Akira Ishii, Osaka (JP); Toyonaga Saitoh, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 425 days.

(21) Appl. No.: 13/363,646

(22) Filed: Feb. 1, 2012

(65) Prior Publication Data

US 2012/0196709 A1  Aug. 2, 2012

(30) Foreign Application Priority Data

Feb. 2, 2011  (JP) .................. 2011-021049

(51) Int. Cl.
*F16H 7/08*  (2006.01)
(52) U.S. Cl.
CPC ...... *F16H 7/0848* (2013.01); *F16H 2007/0806* (2013.01); *F16H 2007/0812* (2013.01); *F16H 2007/0853* (2013.01); *F16H 2007/0859* (2013.01)
USPC .......................................... 474/110; 411/518
(58) Field of Classification Search
CPC .. F16H 7/08; F16H 7/0848; F16H 2007/0806
USPC .......... 474/101, 109–111, 140; 411/517, 518, 411/521; 24/555
See application file for complete search history.

(56) References Cited

U.S. PATENT DOCUMENTS

| | | | | |
|---|---|---|---|---|
| 5,308,207 A * | 5/1994 | Jaskowiak | ..................... | 411/513 |
| 5,577,970 A * | 11/1996 | Smith et al. | ................... | 474/110 |
| 5,615,582 A * | 4/1997 | Rupp | ............................... | 74/498 |
| 6,767,302 B2 * | 7/2004 | Seungpyo | ..................... | 474/109 |
| 6,878,082 B2 * | 4/2005 | Seungpyo | ..................... | 474/109 |
| 6,918,728 B1 * | 7/2005 | Frauhammer et al. | ........ | 411/518 |
| 2004/0067805 A1 | 4/2004 | Hellmich et al. | | |
| 2007/0243961 A1 * | 10/2007 | Aimone | ........................ | 474/109 |
| 2011/0230288 A1 * | 9/2011 | Schulz | .......................... | 474/110 |
| 2012/0225743 A1 | 9/2012 | Ishii | | |
| 2012/0244975 A1 | 9/2012 | Kurematsu | | |

FOREIGN PATENT DOCUMENTS

| JP | 2559664 B | 1/1998 |
|---|---|---|
| JP | 11280727 A | 10/1999 |
| JP | 2004084892 A | 3/2004 |

OTHER PUBLICATIONS

Unpublished U.S. Appl. No. 13/474,792 for Ratchet-Type Tensioner.
Unpublished U.S. Appl. No. 13/477,345 for Ratchet-Type Tensioner.
Notification of notice of refusal (Translation)No. 688008, Ref No. 13594 Dated Oct. 23, 2013 for Patent Application No. 2011-021049.

* cited by examiner

*Primary Examiner* — William E Dondero
*Assistant Examiner* — Mark K Buse
(74) *Attorney, Agent, or Firm* — Howson & Howson LLP

(57) ABSTRACT

There is provided a ratchet-type tensioner whose spring stopping washer for seating a ratchet biasing spring is rigidly and readily assembled to a ratchet-receiving hole so as not to fall out of the ratchet-receiving hole and which reduces flapping noise and prevents seizure of the plunger by securely and stably operating a ratchet mechanism in operating an engine. The ratchet-type tensioner 100 is arranged so that the spring stopping washer has a C-ring anchored in the rear-end area of the ratchet-receiving hole by fitting in a diameter-reduced state and by enlarging its diameter within an anchoring circumferential groove of the ratchet-receiving hole and a spring stopping piece extended from the C-ring to a ring center area to seat the ratchet biasing spring.

6 Claims, 18 Drawing Sheets

$f1 = F1 \times \sin\theta \times \cos\theta$ $f1 = F1 \times \sin\theta \times \cos\theta \times \mu$ $$f2 = F2 \times \sin\theta \times \cos\theta \times \mu$$

RATCHET-TYPE TENSIONER

FIELD OF THE INVENTION

The present invention relates to a ratchet-type tensioner for applying tension to a timing chain for driving camshafts and others of an engine.

BACKGROUND OF THE INVENTION

Hitherto, there has been known to use a tensioner for applying tension to a timing chain for driving camshafts and others of an engine by exerting ejection force on a plunger, slidably and fittingly inserted into a housing and forming an oil chamber with the housing, by a spring and external hydraulic pressure.

As such prior art tensioner, there is adopted a ratchet-type tensioner 500 as shown in FIG. 18 for example. The ratchet-type tensioner 500 comprises a housing 512, a plunger 514 slidably accommodated in the housing 512, a piston 526 slidably and fittingly inserted into the housing 512 in a direction traverse a sliding direction of the plunger 514 and forming a oil sub-chamber 520 between the housing 512 and the piston 526, an oil passage 544 for exerting external hydraulic pressure to the oil sub-chamber 520, a second spring 534 for biasing the piston 526 toward the oil sub-chamber 520, an air chamber 528 provided on the side opposite from the oil sub-chamber 520, sectioned and formed by the housing 512 and the piston 526 and including the second spring 534, a cap 530 fitted into the air chamber 528, an air communicating hole 532 provided in communication with the air chamber 528 and closed by the piston 526 when the external hydraulic pressure acts on the oil sub-chamber 520 and the piston 526 moves against a biasing force of the second spring 534, rack teeth 538 engraved on a part of the plunger 514 surrounded by the housing 512, and a plurality of engaging teeth 536 provided at an edge of a rod 524 fixed to the piston 526 and capable of engaging with the rack 538, wherein plunger-setback blocking tooth surfaces of the engaging teeth 536 and the rack 538 are formed at right angles with respect to a direction in which the plunger 514 advances/sets back (see Patent Document 1 for example).

PRIOR ART DOCUMENT

Patent Document

Patent Document 1: Japanese Utility Model No. 2559664 (Claims, FIG. 1)

DISCLOSURE OF THE INVENTION

Problems to be Solved by the Invention

However, because the cap 530 is sealed by means of press-fitting in a state in which the rod 524 having the plurality of engaging teeth 536 is accommodated within the air chamber 528, the prior art tensioner 500 as described above has had a problem that such a burden of high-precision work that the cap 530 has to be rigidly and securely assembled is required in assembling the cap 530.

Still more, there has been such a cumbersome problem in terms of maintenance works that the cap 530 cannot be removed and the engagement of the engagement teeth 536 of the rod 524 and the rack 538 of the plunger 514 cannot be released even when the plunger 514 of the ratchet-type tensioner is arbitrarily tried to be pressed and set back in carrying out such maintenance works of positioning the ratchet-type tensioner and the timing chain and of replacing parts by loosening the timing chain.

The prior art tensioner 500 described above also has had a cumbersome problem that the cap 530 that seats the second spring 534 is possibly broken or falls out, thus disabling a ratchet mechanism, due to long-term engagement and disengagement operations of the engagement teeth 536 of the rod 524 and the rack 538 of the plunger 514.

Still more, because the plunger setback blocking tooth surfaces of the engagement teeth 536 and the rack 538 are traverse the advance/setback direction of the plunger 514 in the prior art tensioner 500 described above, they restrict also moves of the plunger 514 in the setback direction caused by excessive tension of the chain caused by temperature change and others of the engine. Accordingly, the prior art tensioner 500 has had such problems that the plunger 514 causes seizure or the chain travels with the excessive tension, thus increasing a burden to the chain and noises.

Due to that, although a predetermined backlash amount is provided in the ratchet mechanism composed of the engagement teeth 536 and the rack 538 corresponding to a presumed maximum value of the move of the plunger 514 in the setback direction caused by the excessive tension, there has been a problem that the larger the backlash amount, the less a rattle noise called a flapping noise generated in starting engine can be reduced.

Still more, although it is possible to take such measures of adding an orifice mechanism and an oil-reserve mechanism or of replacing the spring 518 with a high-load accommodated spring in order to solve such problem of the rattle noise prone to be generated on starting the engine, there have been such problems that not only a number of parts and production cost therefor increase, but also the tensioner itself is enlarged.

Accordingly, the present invention aims at solving the aforementioned prior art problems by providing a ratchet-type tensioner whose spring stopping washer for seating a ratchet biasing spring is rigidly and readily assembled to a ratchet-receiving hole without fall out and which reduces flapping noise and prevents seizure of the plunger by securely and stably operating a ratchet mechanism in operating an engine.

Means for Solving the Problems

In order to solve the aforementioned problems, according to Claim 1 of the invention, there is provided a ratchet-type tensioner comprising a housing body in which an oil passage for supplying external pressure oil is formed, a plunger-accommodating hole formed in the housing body, a plunger slidably projecting out of the plunger-accommodating hole toward a traveling chain, a high-pressure oil chamber formed between the plunger-accommodating hole of the housing body and a hollow portion of the plunger, a plunger biasing spring stored in the high-pressure oil chamber to bias the plunger in a plunger projection direction, a ratchet-receiving hole formed within the housing, a columnar ratchet element fittingly inserted into the ratchet-receiving hole and sliding in a direction traverse an advance/setback direction of the plunger, rack teeth provided on a side surface of the plunger, ratchet teeth provided at a plunger-side front-end area of the ratchet element, a ratchet biasing spring for biasing the ratchet element so that the ratchet teeth engage with the rack teeth, and a spring stopping washer fitted into a rear-end area of the ratchet-receiving hole to seat the ratchet biasing spring, wherein the ratchet biasing spring is inserted within a spring-accommodating hole provided within the ratchet element extendably in a sliding direction of the ratchet element in a state partly projecting out of the spring-accommodating hole, and the spring stopping washer has a C-ring anchored in the rear-end area of the ratchet-receiving hole by fitting in a diameter-reduced state and by enlarging its diameter within an anchoring circumferential groove of the ratchet-receiving hole and a spring stopping piece extended from the C-ring to a ring center area to seat the ratchet biasing spring.

According to Claim 2 of the invention, in addition to the arrangement of the invention of Claim 1, the spring stopping washer has diameter-reducing pin engaging holes respectively at both ends of the C-ring to reduce a diameter of the C-ring by drawing the both ends of the C-ring each other by means of diameter-reducing tool pins.

According to Claim 3 of the invention, in addition to the arrangement of the invention of Claim 1 or 2, the spring stopping piece is integrally formed with the C-ring through an intermediary of a narrow neck-like link portion that rises toward the ratchet biasing spring from the C-ring.

According to Claim 4 of the invention, in addition to the arrangement of the invention of Claim 3, the spring stopping piece is held by the narrow neck-like link portion and the both ends of the C-ring while overlapping with the both ends of the C-ring at the rear-end area of the ratchet-receiving hole.

According to Claim 5 of the invention, in addition to the arrangement of the invention of any one of Claims 1 through 4, the biasing force of the ratchet biasing spring is set to be greater than a component force in the sliding direction of the ratchet element caused by the reaction force that is generated from the traveling chain side and sets back the plunger on starting the engine to be smaller than a component force in the sliding direction of the ratchet element caused by the reaction force that is generated from the traveling chain side and sets back the plunger when tension of the chain is excessive after starting the engine.

According to Claim 6 of the invention, in addition to the arrangement of the invention of any one of Claim 1 through 5, the rack teeth of the plunger are formed concave-convexly respectively by the stop surfaces inclined toward the plunger-advancing side with respect to the sliding direction of the ratchet element and the sliding surfaces inclined toward the plunger-setback side with respect to the sliding direction of the ratchet element, and the ratchet teeth of the ratchet element are formed concavo-convexly respectively by the stop counterface surfaces inclined toward the advance-direction side with respect to the sliding direction of the ratchet element and the sliding counterface surfaces inclined toward the plunger-setback side with respect to the sliding direction of the ratchet.

According to Claim 7 of the invention, in addition to the arrangement of the invention of Claim 6, the inclination angle of the stop surface is set to be smaller than the inclination angle of the sliding surface.

According to Claim 8 of the invention, in addition to the arrangement of the invention of any one of Claims 1 through 7, the ratchet element has a whole length which is greater than an outer diameter thereof.

Advantageous Effects of the Invention

Then, because the ratchet-type tensioner of the invention comprises the housing body in which the oil passage for supplying external pressure oil is formed, the plunger-accommodating hole formed in the housing body, the plunger slidably projecting out of the plunger-accommodating hole toward the traveling chain, the high-pressure oil chamber formed between the plunger-accommodating hole of the housing body and the hollow portion of the plunger, the plunger biasing spring stored in the high-pressure oil chamber to bias the plunger in the plunger projection direction, the ratchet-receiving hole formed within the housing, the columnar ratchet element fittingly inserted into the ratchet-receiving hole and sliding in the direction traverse the advance/setback direction of the plunger, the rack teeth provided on the side surface of the plunger, the ratchet teeth provided at the plunger-side front-end area of the ratchet element, the ratchet biasing spring for biasing the ratchet element so that the ratchet teeth engage with the rack teeth, and the spring stopping washer fitted into a rear-end area of the ratchet-receiving hole to seat the ratchet biasing spring, it is possible not only to apply tension to a timing chain within an engine from the plunger of the ratchet-type tensioner but also to bring about the following effects peculiar to the invention.

That is, according to Claim 1 of the ratchet-type tensioner of the invention, because the ratchet biasing spring is inserted within a spring-accommodating hole provided within the ratchet element extendably in the sliding direction of the ratchet element in the state partly projecting out of the spring-accommodating hole, the most of the ratchet biasing spring necessary for extending/contracting actions is inserted and is securely surrounded and retained by a peripheral wall of the ratchet-receiving hole. Accordingly, it becomes possible to buckling of the ratchet biasing spring, to simplify and downsize the configuration for attaching the ratchet element to the ratchet-receiving hole of the housing body and to lighten the ratchet element itself because the ratchet element is hollowed out by the spring-accommodating hole.

Still more, because the spring stopping washer has the C-ring anchored in the rear-end area of the ratchet-receiving hole by fitting in the diameter-reduced state and by enlarging its diameter within the anchoring circumferential groove of the ratchet-receiving hole and the spring stopping piece extended from the C-ring to the ring center area to seat the ratchet biasing spring, the C-ring of the spring stopping washer whose diameter is enlarged in the radial direction of the ratchet-receiving hole traverse the sliding direction of the ratchet element is positioned and anchored within the anchoring circumferential groove of the ratchet-receiving hole. Therefore, even if the ratchet biasing spring seated on the spring stopping washer extends or contracts as the ratchet element slides, it becomes possible to completely prevent the spring stopping washer from falling out to the outside from the anchoring circumferential groove and to assemble the spring stopping washer rigidly to the ratchet-receiving hole of the housing body because the spring stopping piece blocks the impact receiving from the ratchet biasing spring without propagating to the C-ring.

According to Claim 2 of the ratchet-type tensioner of the invention, because the spring stopping washer has the diameter-reducing pin engaging holes respectively at the both ends of the C-ring to reduce the diameter of the C-ring by drawing the both ends of the C-ring each other by means of the diameter-reducing tool pins, in addition to the effect brought about by the invention of Claim 1, it becomes possible to enlarge/reduce the diameter of the C-ring of the spring stopping washer arbitrarily by the diameter-reducing tool pins engaged with the diameter-reducing pin engaging holes and to easily perform assembly and decomposing operations such as assembly and removal of the spring stopping washer to/from the ratchet-receiving hole of the housing body.

According to Claim 3 of the ratchet-type tensioner of the invention, because the spring stopping piece is integrally formed with the C-ring through the intermediary of the narrow neck-like link portion that rises toward the ratchet biasing spring from the C-ring, in addition to the effect brought about by the invention of Claim 1 or 2, it becomes possible to securely seat the ratchet biasing spring, that extends and contracts due to the projecting/receding actions of the ratchet element, on the spring stopping piece because the spring stopping piece exhibits resilience against repetitive loads from the ratchet biasing spring by the rise thereof with respect to the C-ring through the intermediary of the narrow neck-like link portion.

According to Claim 4 of the ratchet-type tensioner of the invention, because the spring stopping piece is held by the narrow neck-like link portion and the both ends of the C-ring while overlapping with the both ends of the C-ring at the rear-end area of the ratchet-receiving hole, in addition to the effect brought about by the invention of Claim 3, the spring stopping piece is supported by the both of the narrow neck-like link portion and the both ends of the C-ring and it becomes possible to avoid bending stress otherwise applied to the narrow neck-like link portion by the repetitive loads from the ratchet biasing spring. Accordingly, the spring stopping washer can exhibit excellent strength and durability to the repetitive loads from the ratchet biasing spring.

According to Claim 5 of the ratchet-type tensioner of the invention, because the biasing force of the ratchet biasing spring is set to be greater than the component force in the sliding direction of the ratchet element caused by the reaction force that is generated from the traveling chain side and sets back the plunger on starting the engine, in addition to the effect brought about by the invention of any one of Claims 1 through 4, the biasing force of the ratchet biasing spring acts on the ratchet teeth so as to engage with the rack teeth of the plunger when the reaction force that sets back the plunger is generated on starting the engine. Therefore, it becomes possible not only to block the setback displacement of the plunger causing backlash by restricting the move thereof in the setback direction and to reduce the flapping noise of the timing chain but also to reduce the number of parts and the production cost and to downsize the tensioner itself without requiring any special high-load accommodating plunger biasing spring, orifice mechanism and oil reserving mechanism because the biasing force of the plunger biasing spring suffices just as the biasing force for biasing and projecting the plunger.

Still more, because the biasing force of the ratchet biasing spring is set to be smaller than the component force in the sliding direction of the ratchet element caused by the reaction force that is generated from the traveling chain side and sets back the plunger when tension of the chain is excessive after starting the engine, the biasing force of the ratchet biasing spring acts on the ratchet teeth of the ratchet element, the ratchet teeth of the ratchet element disengage from the rack teeth of the plunger and the plunger is set back until when the biasing force of the ratchet biasing spring becomes relatively greater than the component force in the sliding direction of the ratchet element when the reaction force that sets back the plunger is generated when the tension of the chain is excessive after starting the engine. Therefore, even if the plunger advances excessively due to temperature change of the engine and others, it becomes possible not only to prevent the seizure of the plunger by allowing the setback displacement by not restricting the move of the plunger in the setback direction, but also to securely prevent the seizure of the plunger because it becomes possible to control the timing of the disengagement caused by the excessive tension of the chain after starting the engine by regulating the biasing force of the ratchet biasing spring.

According to Claim 6 of the ratchet-type tensioner of the invention, because the rack teeth of the plunger are formed concave-convexly respectively by the stop surfaces inclined toward the plunger-advancing side with respect to the sliding direction of the ratchet element and the sliding surfaces inclined toward the plunger-setback side with respect to the sliding direction of the ratchet element, and the ratchet teeth of the ratchet element are formed concavo-convexly respectively by the stop counterface surfaces inclined toward the advance-direction side with respect to the sliding direction of the ratchet element and the sliding counterface surfaces inclined toward the plunger-setback side with respect to the sliding direction of the ratchet element, in addition to the effect brought about by the invention of any one of Claims 1 through 5,□@when the reaction force that sets back the plunger is generated when the tension is excessive□@after starting the engine, the reaction force acts on the stop counterface surfaces of the ratchet element as the component force through the stop surfaces on the plunder side. This component force that acts on the stop counterface surfaces of the ratchet element acts further as the smaller component force in the sliding direction of the ratchet element so as to disengage the ratchet teeth of the ratchet element from the rack teeth of the plunger. Then, the rack teeth of the plunger slide the sliding counterface surface by going over the stop counterface surface and return by one tooth, so that it becomes possible to smoothly allow the setback displacement without restricting the move of the plunger in the setback direction while preventing wear and damage such as chipping of the teeth that is prone to occur in the ratchet teeth and the rack teeth when the tension of the chain is excessive after starting the engine and to exhibit excellent durability by avoiding excessive impact on the ratchet biasing spring.

According to Claim 7 of the ratchet-type tensioner of the invention, because the inclination angle of the stop surface is set to be smaller than the inclination angle of the sliding surface, in addition to the effect brought about by the invention of Claim 6, it becomes possible to block the disengagement of the rack teeth of the plunger and the ratchet teeth of the ratchet element even when the reaction force that sets back the plunger is generated on starting the engine. Therefore, it is possible to block the setback displacement of the plunger causing backlash by restricting the move in the setback direction thereof on starting the engine.

According to Claim 8 of the ratchet-type tensioner of the invention, because the ratchet element has the whole length which is greater than the outer diameter thereof, in addition to the effect brought about by the invention of any one of Claims 1 through 7, it becomes possible to operate the ratchet mechanism comprising the plunger and the ratchet element more smoothly by suppressing inclination and preventing biased wear of the ratchet element, that is otherwise prone to be caused within the ratchet-receiving hole in the sliding direction, even when an overload is loaded to the ratchet element.

PREFERRED EMBODIMENT OF THE INVENTION

Figure 1:
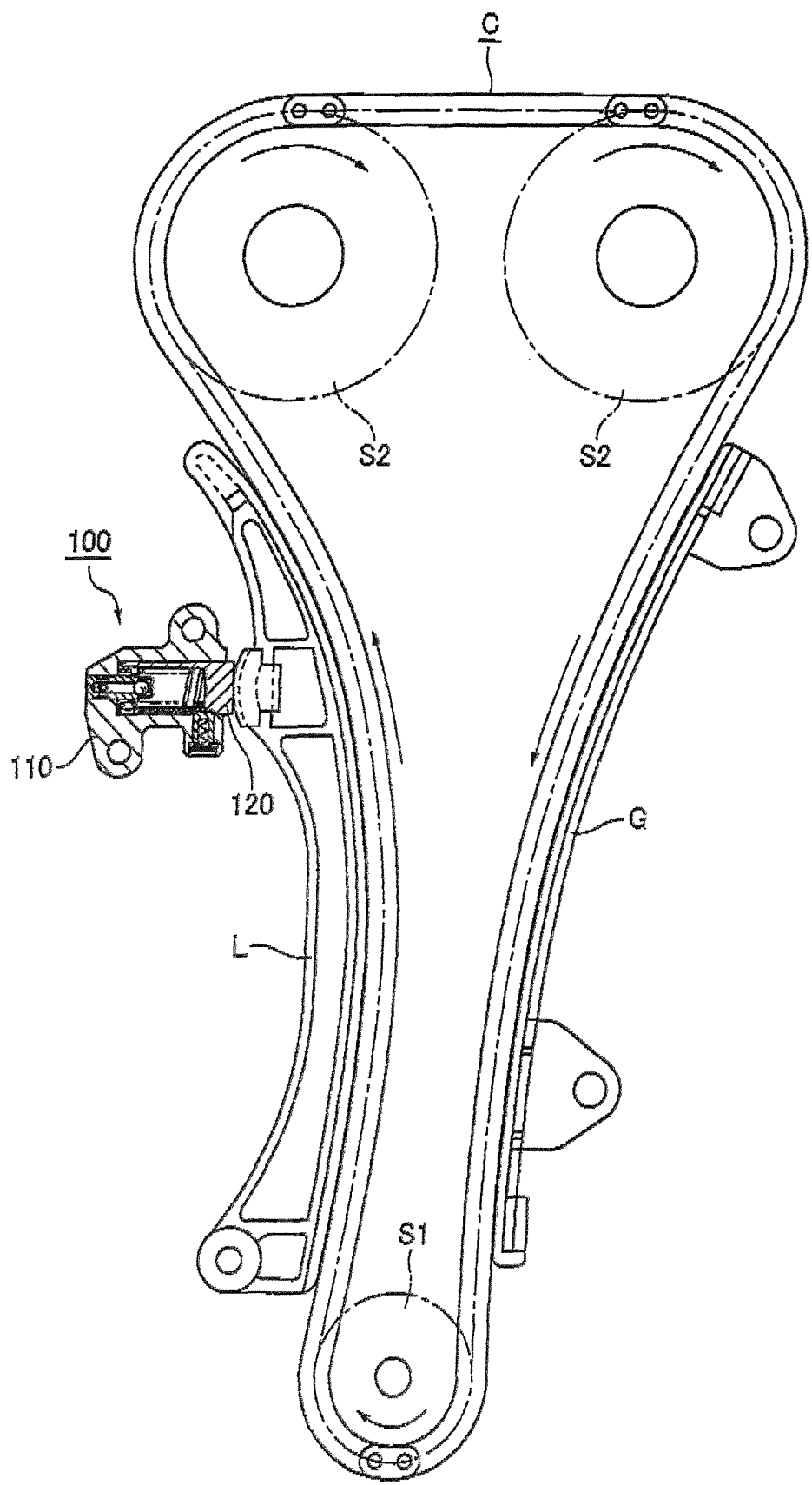
FIG. 1 illustrates a mode of use of a ratchet-type tensioner 100 of a first embodiment of the invention.

A specific mode of a ratchet-type tensioner of the present invention may take any mode as long as the ratchet-type tensioner comprises a housing body in which an oil passage for supplying external pressure oil is formed, a plunger-accommodating hole formed in the housing body, a plunger slidably projecting out of the plunger-accommodating hole toward a traveling chain, a high-pressure oil chamber formed between the plunger-accommodating hole of the housing body and a hollow portion of the plunger, a plunger biasing spring accommodated in the high-pressure oil chamber to bias the plunger in a plunger projection direction, a ratchet-receiving hole formed within the housing, a columnar ratchet element fittingly inserted into the ratchet-receiving hole and sliding in a direction traverse an advance/setback direction of the plunger, ratchet teeth provided at a plunger-side front-end area of the ratchet element, a ratchet biasing spring for biasing the ratchet teeth toward rack teeth provided on a side surface of the plunger, and a spring stopping washer fitted into a rear-end area of the ratchet-receiving hole to seat the ratchet biasing spring, wherein the ratchet biasing spring is inserted within a spring-accommodating hole provided within the ratchet element extendably in a sliding direction of the ratchet element in a state partly projecting out of the spring-accommodating hole and the spring stopping washer has a C-ring anchored in the rear-end area of the ratchet-receiving hole by fitting in a diameter-reduced state and by enlarging its diameter within an anchoring circumferential groove of the ratchet-receiving hole and a spring stopping piece extended from the C-ring to a ring center area to seat the ratchet biasing spring. Then, the ratchet-type tensioner allows the spring stopping washer for seating the ratchet biasing spring to be rigidly and readily assembled to the ratchet-receiving hole without falling out of the ratchet-receiving hole, reduces flapping noise by operating the ratchet mechanism securely and stably in operating an engine and prevents seizure of the plunger.

For instance, a basic configuration of the housing body in the ratchet-type tensioner of the invention may be any one of what introduces pressure oil supplied from an oil pump to the oil supplying passage formed within the housing body or what is provided with an oil reservoir concavely formed on a back part of the housing body to once reserve the pressure oil supplied from the oil pump before introducing the oil supplying passage formed in the housing body.

In the case of the ratchet-type tensioner of the invention, a check valve unit for blocking a back flow of the pressure oil from the high-pressure oil chamber to the oil supplying passage may be either one which is assembled in a bottom of the plunger-accommodating hole or one which is not assembled in the bottom of the plunger-accommodating hole. Still more, in the case of the ratchet-type tensioner comprising the check valve unit described above, its concrete unit structure may be any known type as long as it is assembled in the bottom of the plunger-accommodating hole and blocks the pressure oil from flowing back from the high-pressure oil chamber to the oil supplying path. For instance, the check valve unit may be a type having a ball seat communicating with the oil supplying path for supplying the pressure oil to the high-pressure oil chamber, a check ball seated on a valve seat of the ball seat, a biasing force for pressing and biasing the check ball to the ball seat and a bell-like retainer for restricting a move of the check ball.

Then, a biasing force of the ratchet biasing spring used in the ratchet-type tensioner of the invention may have any absolute value as long as it is set to be greater than a component force in the sliding direction of the ratchet element caused by a reaction force that is generated from a traveling chain side and sets back the plunger on starting the engine and is set to be smaller than a component force in the sliding direction of the ratchet element caused by a reaction force that is generated when tension of the chain is excessive and sets back the plunger after starting the engine. It is more preferable to set the biasing force by taking a coefficient of friction between the rack teeth of the plunger and the ratchet teeth of the ratchet element.

Still more, a specific configuration of the ratchet teeth formed on the ratchet element used in the invention is preferable to be two or more ratchet teeth having teeth distances with equal pitch and equal tooth height because the ratchet teeth can engage with the rack teeth on the side surface of the plunger equally while dispersing a load.

Embodiment

Figure 8:
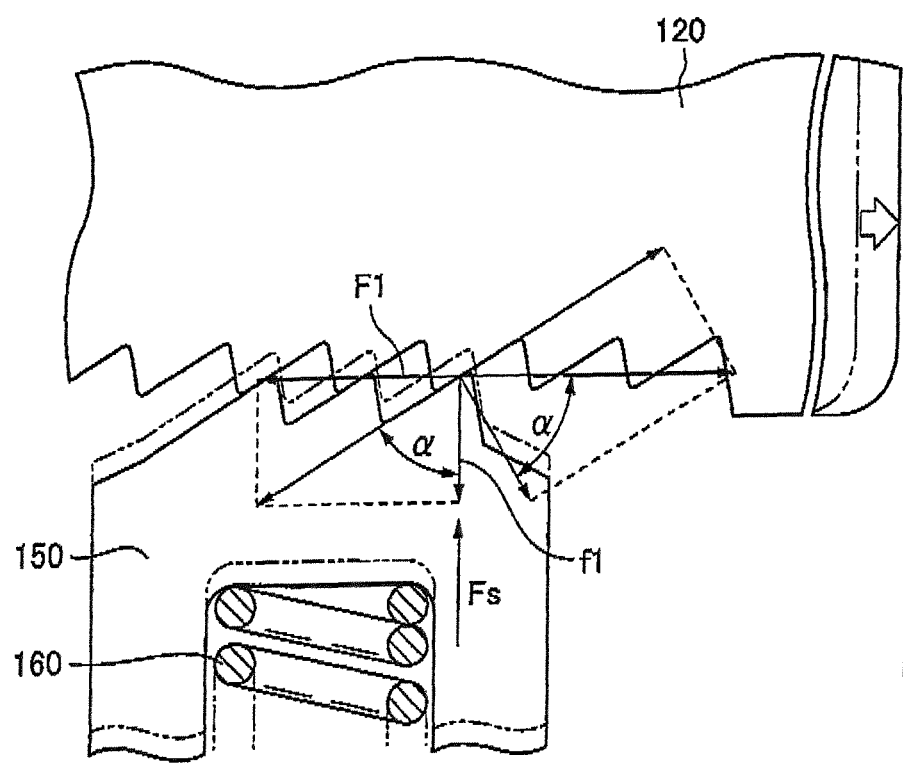
FIG. 8 is a diagram illustrating an engagement state of the rack teeth and ratchet teeth associated with a plunger ejecting operation in starting an engine.
Figure 9:
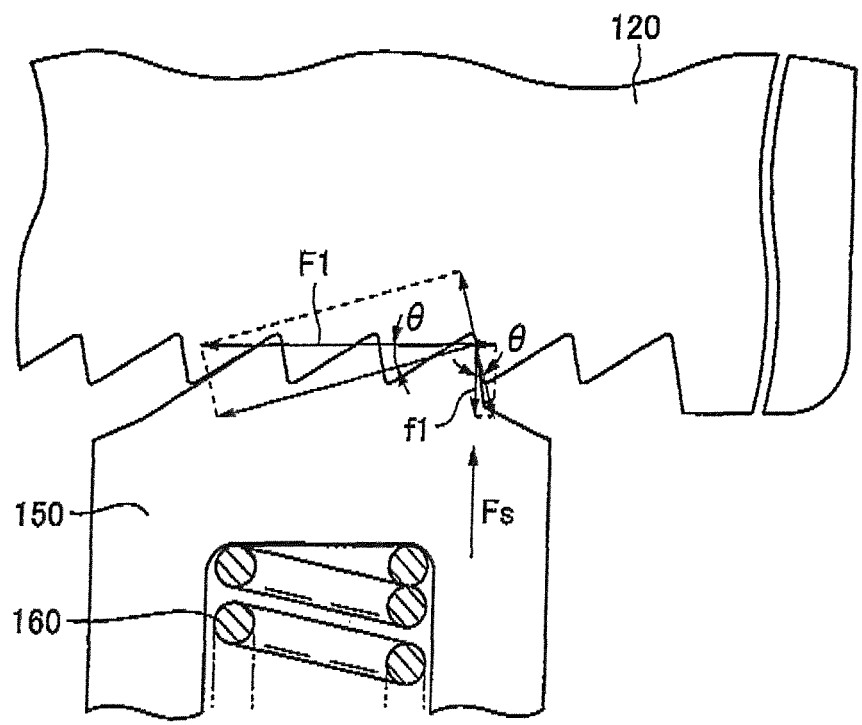
FIG. 9 is a diagram illustrating an engagement state of the rack teeth and ratchet teeth associated with a plunger setback operation in starting an engine.
Figure 10:
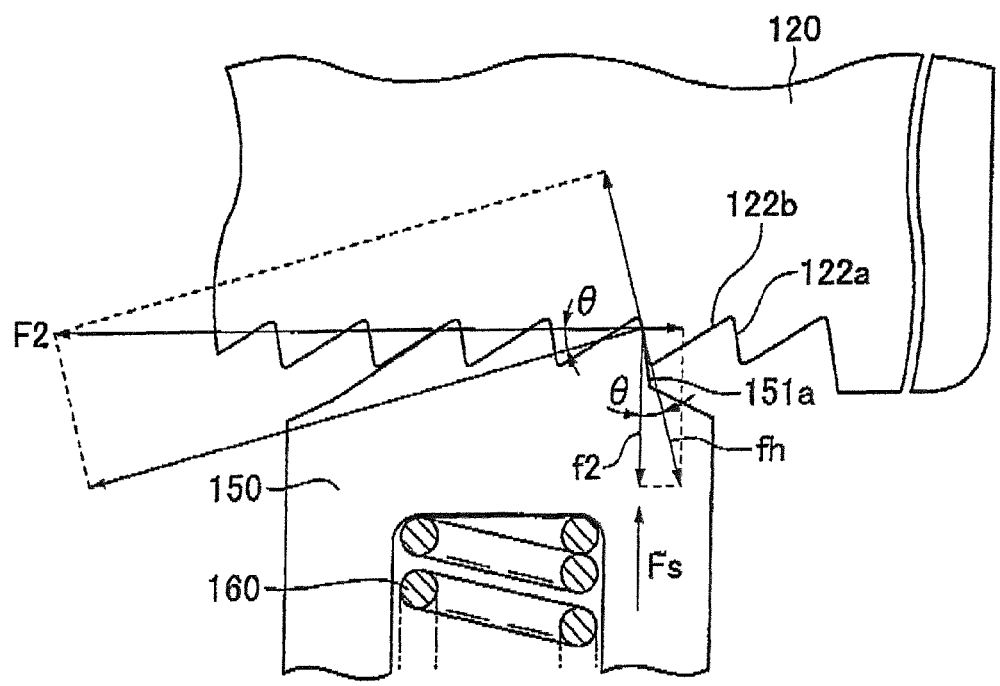
FIG. 10 is a diagram illustrating an engagement state of the rack teeth and ratchet teeth when the plunger starts to set back when a tension of chain is excessive.
Figure 11:
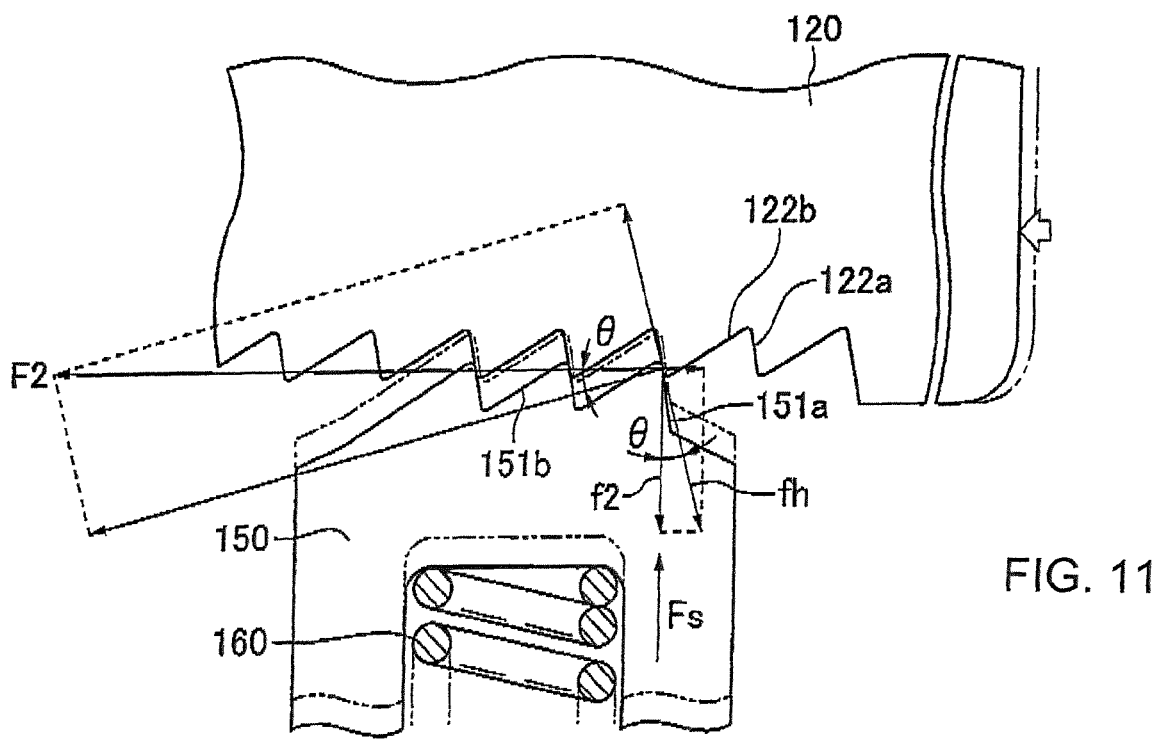
FIG. 11 is a diagram illustrating a disengagement state of the rack teeth and ratchet teeth during the plunger setback operation when the tension of the chain is excessive.
Figure 12:
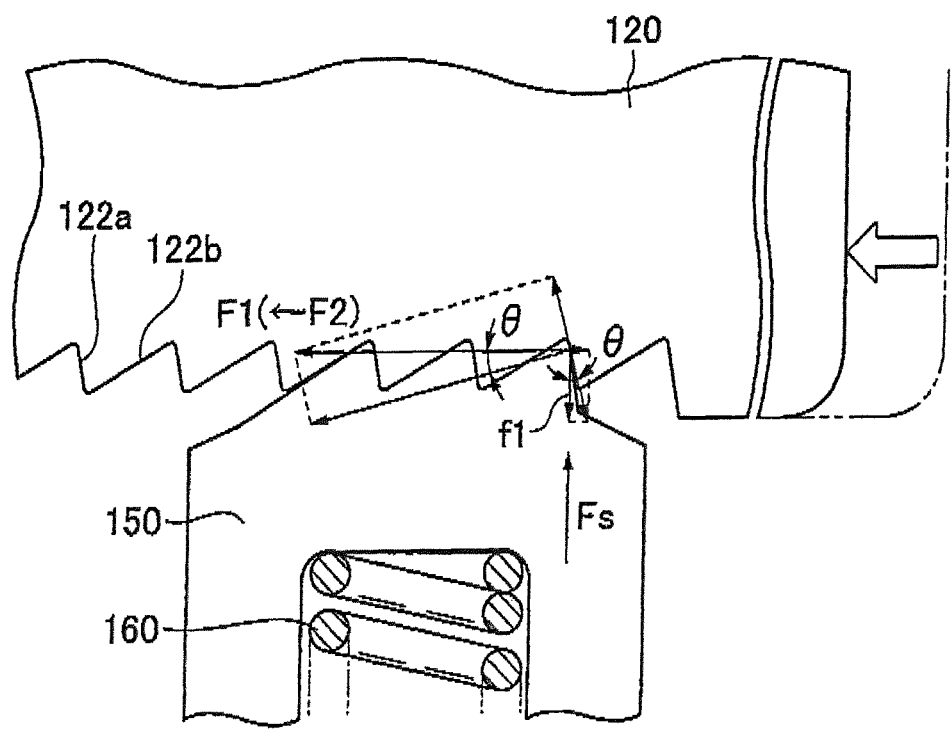
FIG. 12 is a diagram illustrating an engagement state of the rack teeth and ratchet teeth when the plunger finishes to set back when the tension of the chain is excessive.
Figure 13:
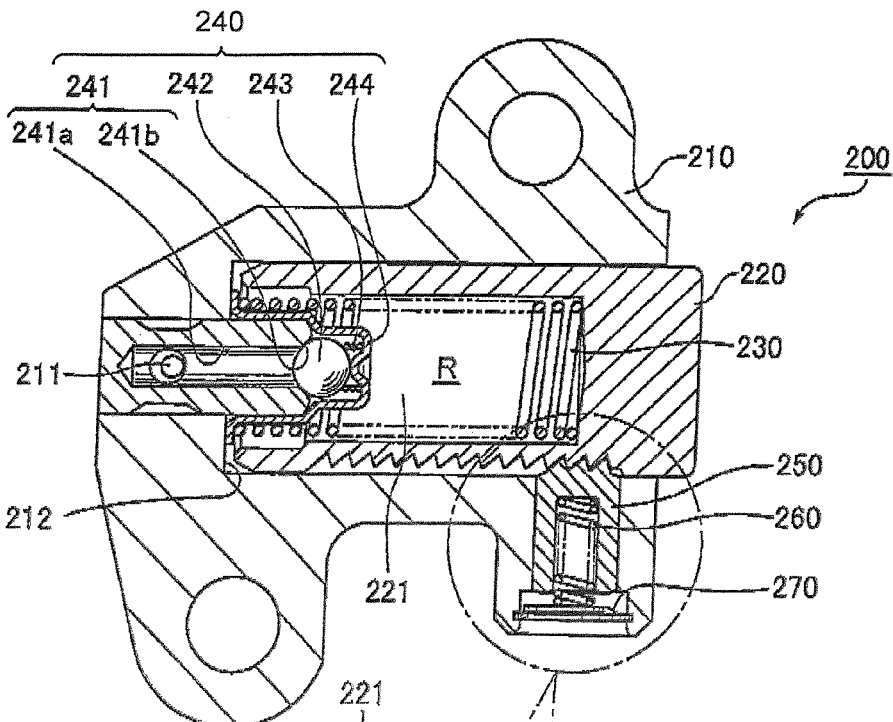
FIG. 13 is an enlarged view of a main part of a ratchet-type tensioner 200 of a second embodiment of the invention.
Figure 13:
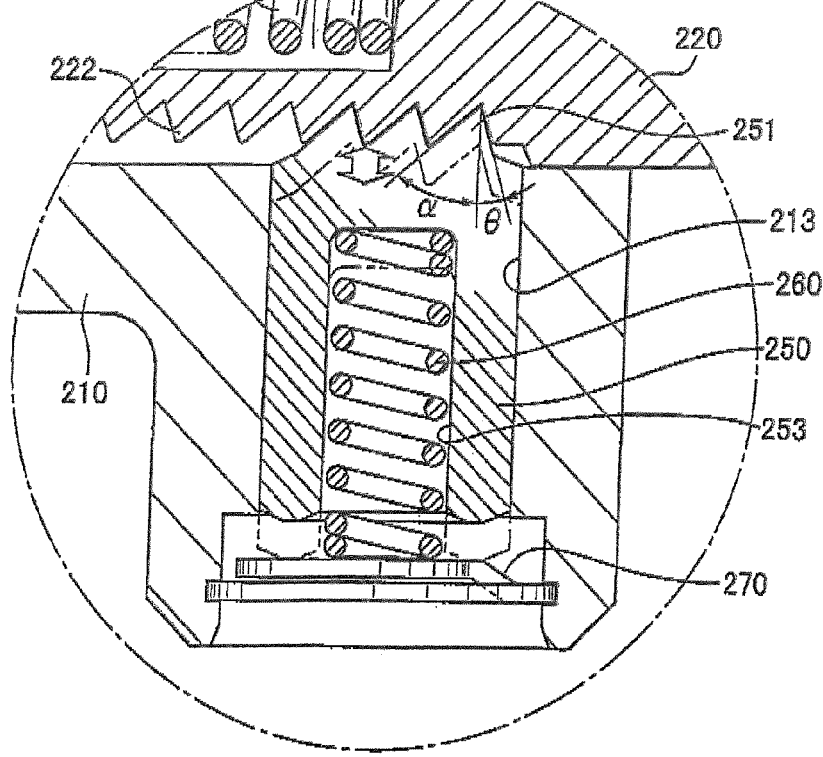
Figure 14:
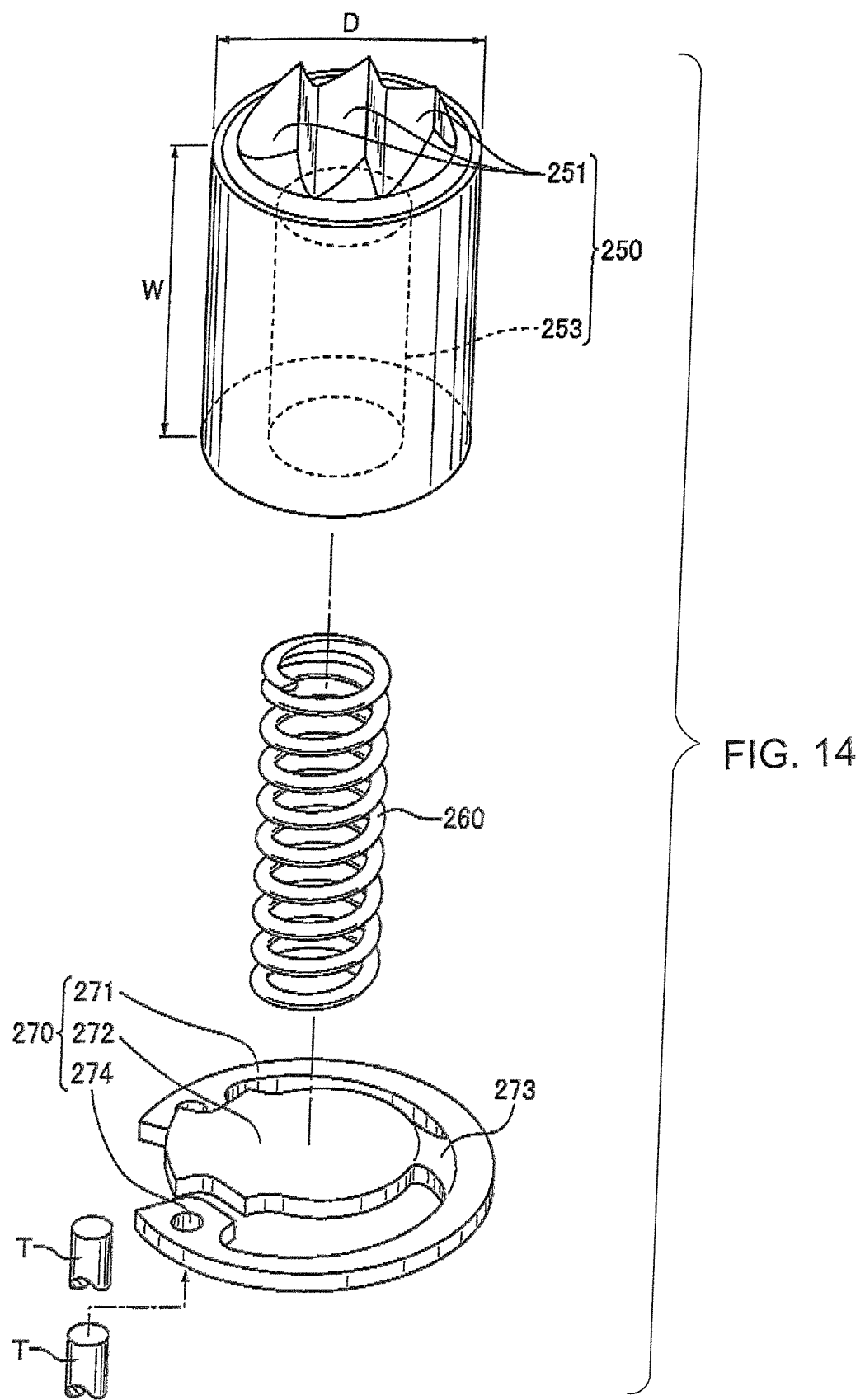
FIG. 14 is an exploded view of the ratchet element, the ratchet biasing spring and the spring stopping washer.
Figure 15A:
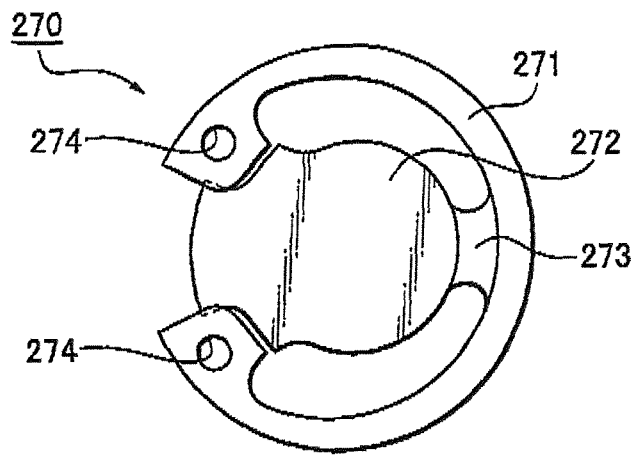
FIG. 15 is an explanatory view illustrating a state just before assembling the spring stopping washer.
Figure 15B:
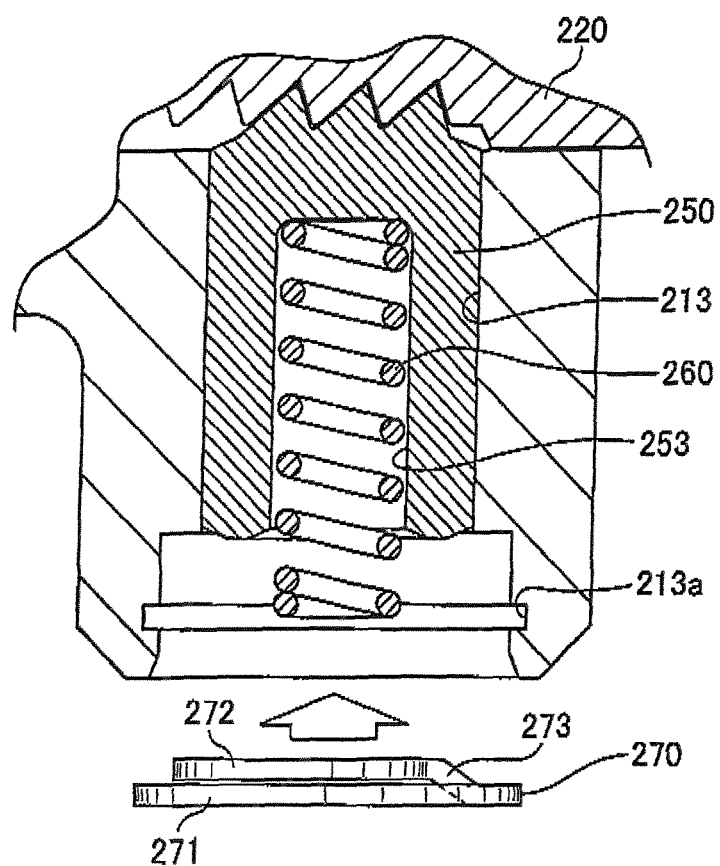
Figure 16A:
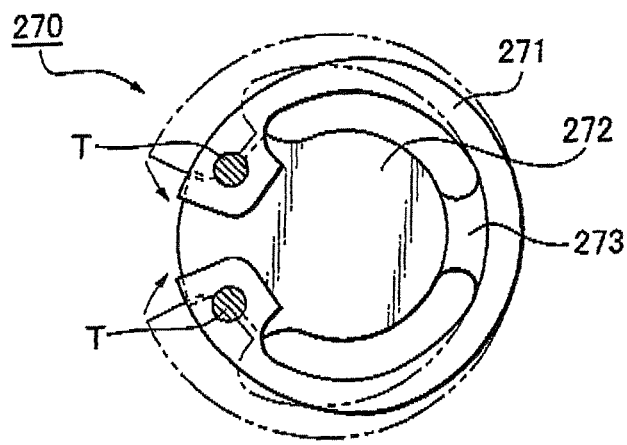
FIG. 16 is an explanatory view illustrating a state during assembling the spring stopping washer.
Figure 16B:
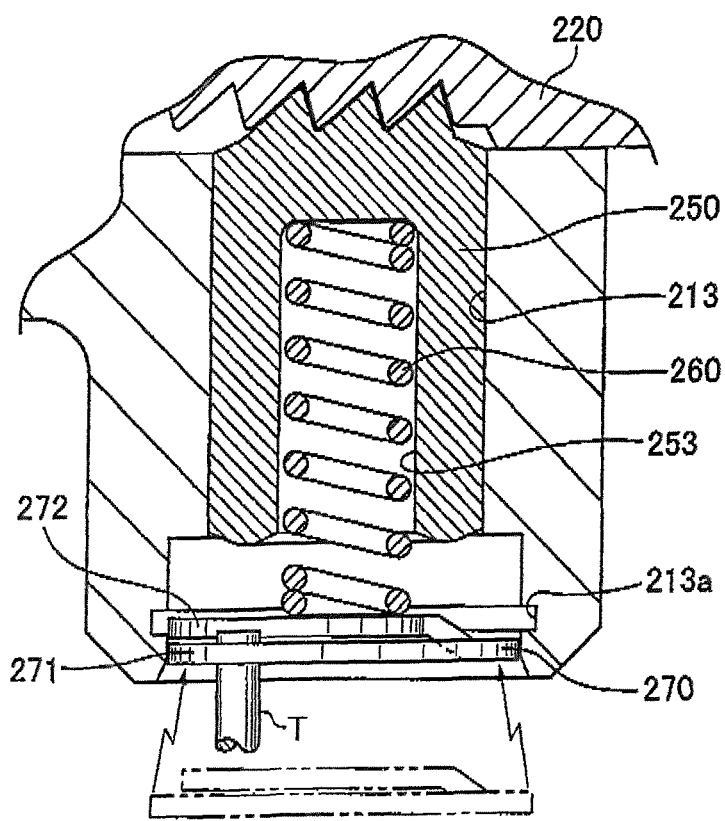
Figure 17A:
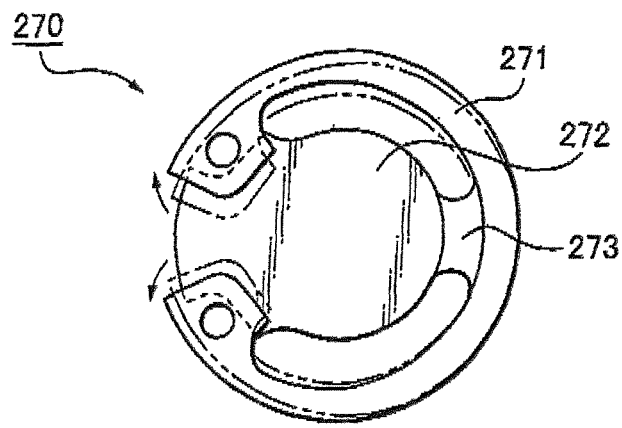
FIG. 17 is an explanatory view illustrating a state just after assembling the spring stopping washer.
Figure 17B:
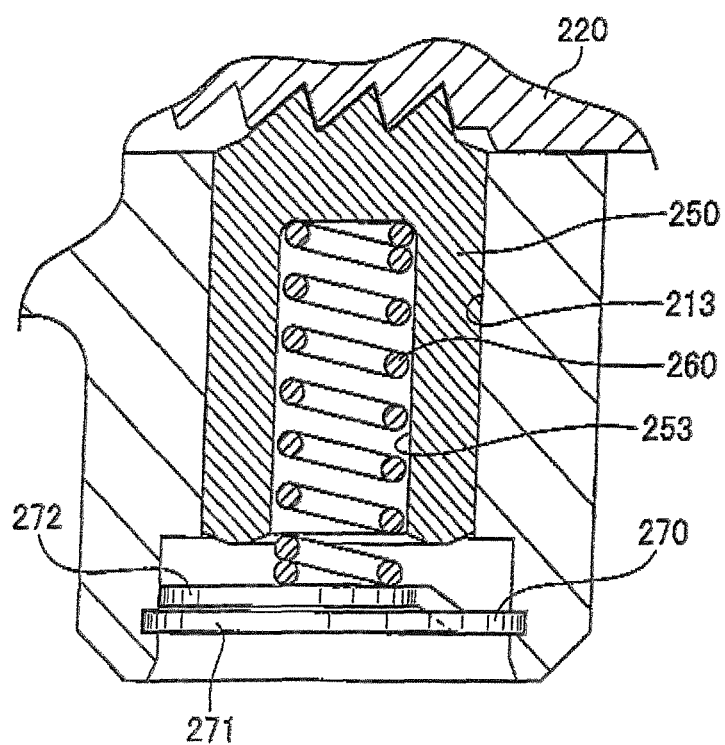
Figure 18:
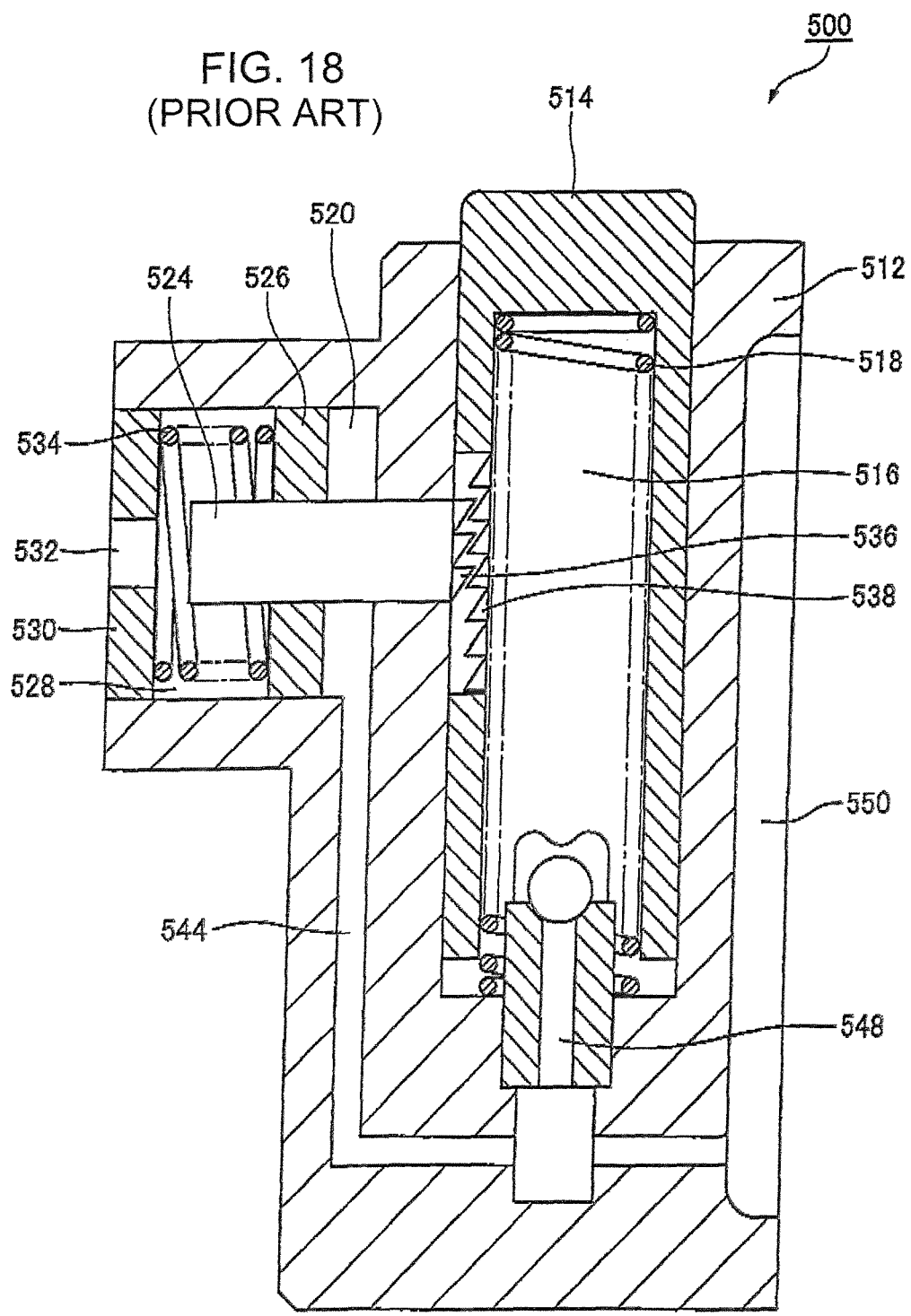
FIG. 18 is a section view of a prior art ratchet-type tensioner 500.

One embodiment of the ratchet-type tensioner 100 of the invention will be explained with reference to FIGS. 1 through 17. Here, FIG. 1 illustrates a mode of use of a ratchet-type tensioner 100 of a first embodiment of the invention, FIG. 2 is an enlarged view of a main part of the ratchet-type tensioner shown in FIG. 1, FIG. 3 is an enlarged view of rack teeth and ratchet teeth, FIG. 4 is an exploded view of a ratchet element, a ratchet biasing spring and a spring stopping washer, FIG. 5 is an explanatory view illustrating a state just before assembling the spring stopping washer, FIG. 6 is an explanatory view illustrating a state during assembling the spring stopping washer, FIG. 7 is an explanatory view illustrating a state just after assembling the spring stopping washer, FIG. 8 is a diagram illustrating an engagement state of the rack teeth and ratchet teeth associated with a plunger ejecting operation in starting an engine, FIG. 9 is a diagram illustrating an engagement state of the rack teeth and ratchet teeth associated with a plunger setback operation in starting an engine, FIG. 10 is a diagram illustrating an engagement state of the rack teeth and ratchet teeth when the plunger starts to set back when a tension of chain is excessive, FIG. 11 is a diagram illustrating a disengagement state of the rack teeth and ratchet teeth during the plunger setback operation when the tension of the chain is excessive, FIG. 12 is a diagram illustrating an engagement state of the rack teeth and ratchet teeth when the plunger finishes to set back when the tension of the chain is excessive, FIG. 13 is an enlarged view of a main part of a ratchet-type tensioner 200 of a second embodiment of the invention, FIG. 14 is an exploded view of the ratchet element, the ratchet biasing spring and the spring stopping washer, FIG. 15 is an explanatory view illustrating a state just before assembling the spring stopping washer, FIG. 16 is an explanatory view illustrating a state during assembling the spring stopping washer, and FIG. 17 is an explanatory view illustrating a state just after assembling the spring stopping washer.

As shown in FIG. 1, the ratchet-type tensioner 100 of the first embodiment of the invention is attached to an engine body on a slack side of a timing chain C which is wrapped around a driving sprocket S1 rotated and driven by a crankshaft of the engine and a pair of driven sprockets S2 fixed to camshafts. The ratchet-type tensioner 100 has a housing body 110 and a plunger 120 that slidably projects out of a front surface of the housing body 110. The plunger 120 applies tension to the slack side of the timing chain C through an intermediary of a movable lever L rockably supported on the engine body side by pressing a back of the movable lever L near a rocking end. It is noted that a stationary guide G for guiding travel of the timing chain C is mounted to the engine body on a tension side of the timing chain C.

When the driving sprocket S1 rotates in a direction of an arrow in FIG. 1, the timing chain C travels in the direction of the arrow. Then, the driven sprockets S2 also rotate in the direction of the arrows and thus the rotation of the sprocket S1 is transmitted to the driven sprockets S2.

Figure 2:
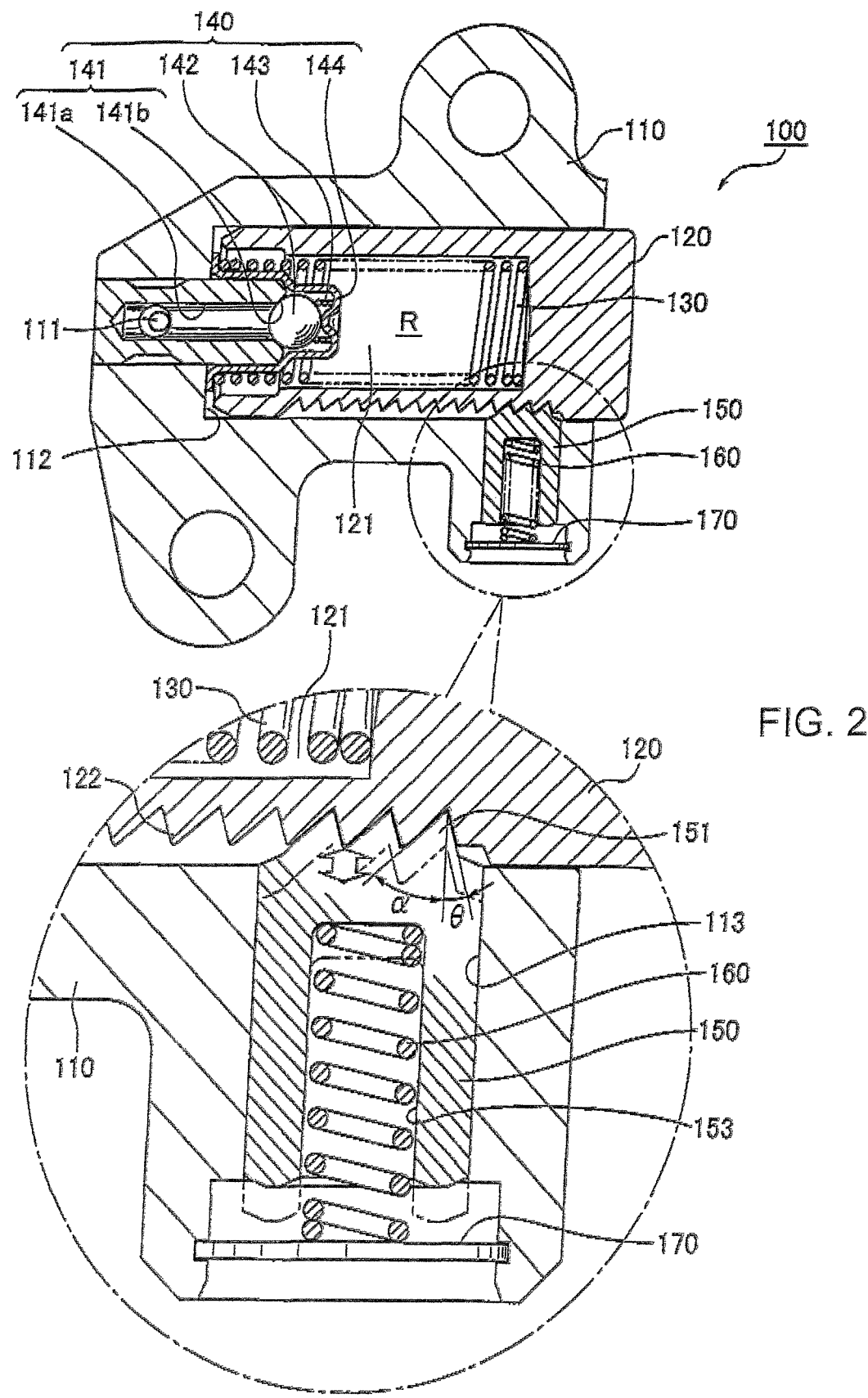
FIG. 2 is an enlarged view of a main part of the ratchet-type tensioner shown in FIG. 1.
Figure 3:
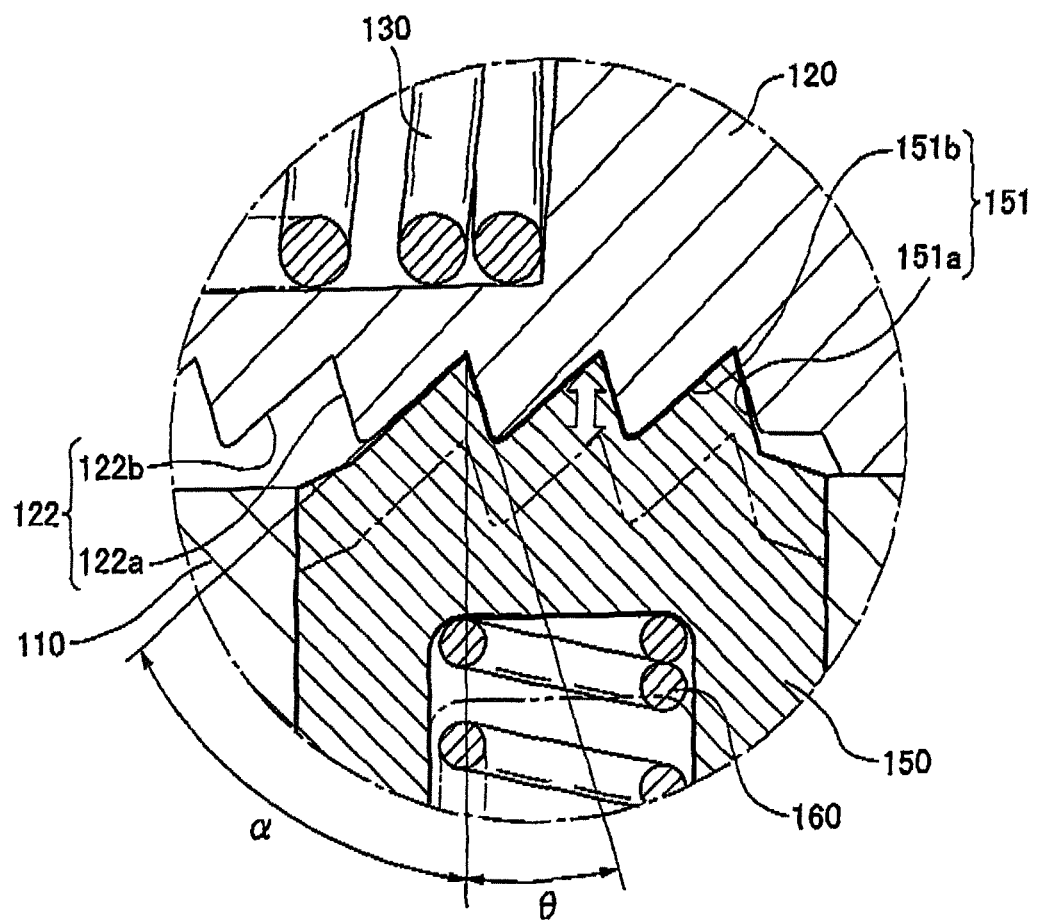
FIG. 3 is an enlarged view of rack teeth and ratchet teeth.
Figure 4:
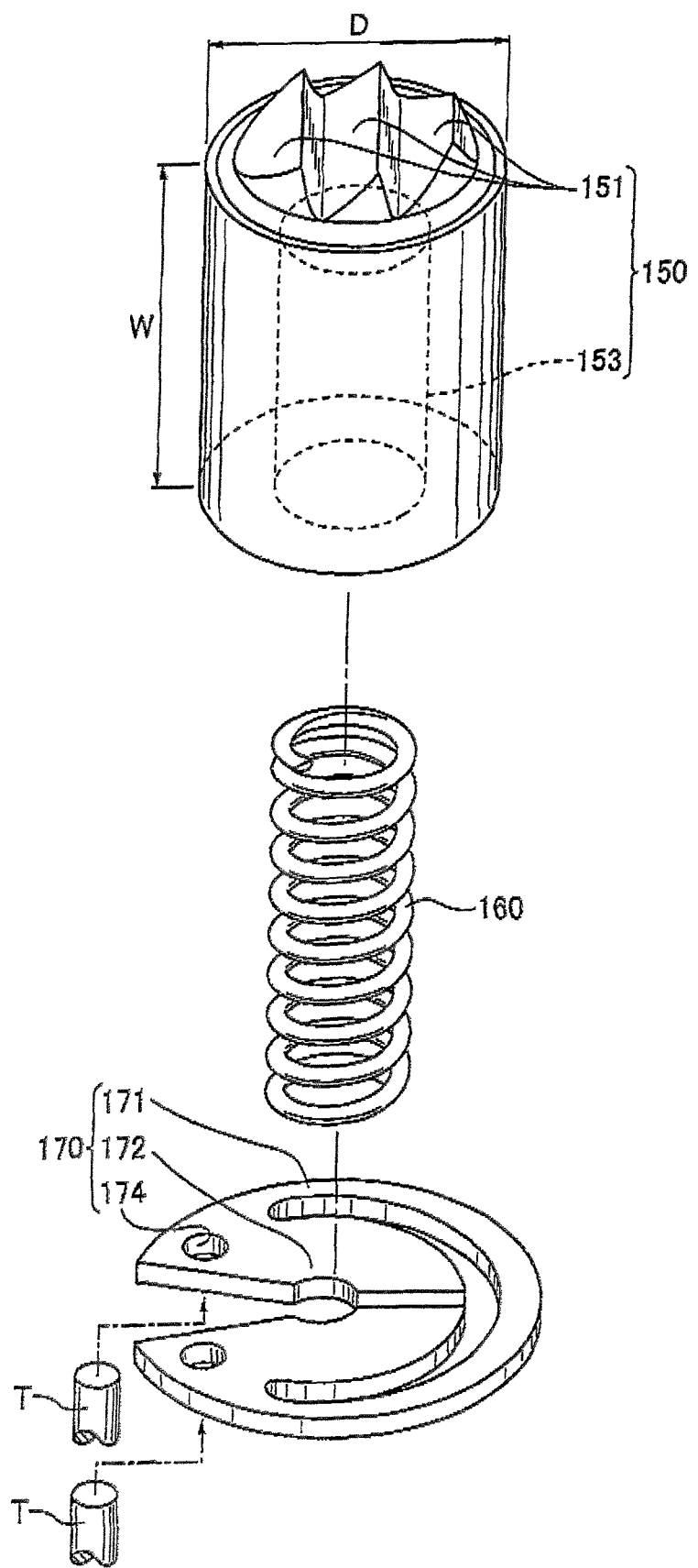
FIG. 4 is an exploded view of a ratchet element, a ratchet biasing spring and a spring stopping washer.

As shown in FIGS. 2 and 3, the ratchet-type tensioner 100 has a housing body 110 having an oil supplying path 111 for introducing external pressure oil supplied from the engine body, a plunger-accommodating hole 112 for accommodating the plunger 120, the columnar plunger 120 that slidably projects out of the plunger-accommodating hole 112 to the traveling chain (not shown), a high-pressure oil chamber R formed between the plunger-accommodating hole 112 of the housing body 110 and a hollow portion 121 of the plunger 120, a plunger biasing spring 130 accommodated within the high-pressure oil chamber 131 and biasing the plunger 120 in the plunger projecting direction, a check valve unit 140 assembled at a bottom portion of the plunger-accommodating hole 112 to block a backward flow of the pressure oil from the high-pressure oil chamber 131 to the oil supplying path 111, a cylindrical ratchet-receiving hole 113 formed in the housing body 110, a columnar ratchet element 150 fittingly inserted into the ratchet-receiving hole 113 and slides in a direction traverse the advance/setback direction of the plunger 120, A ratchet biasing spring 160 for biasing the ratchet element 150 so that ratchet teeth 151 provided at a plunger-side edge area of the ratchet element 150 engage with rack teeth 122 engraved on a side surface of the plunger and A spring stopping washer 170 fitted into a rear edge area of the ratchet-receiving hole 113 and seating the ratchet biasing spring 160.

(Specific Unit Structure of Check Valve Unit 140) A specific unit structure of the check valve unit 140 described above may be any known type as long as it is assembled at the bottom portion of the plunger-accommodating hole 112 and blocks the pressure oil from flowing back from the high-pressure oil chamber R to the oil supplying path ill. However, the present embodiment adopts the check valve unit 140 having a ball seat 141 having an oil passage 141a linked with the oil supplying path 111 of the housing body 110 described above, a check ball 142 seated on a valve seat 141b of the ball seat 141, a ball biasing spring 143 for pressing and biasing the check ball 142 to the ball seat 141 and a bell-like retainer 144 for supporting the ball biasing spring 143 and restricting a move of the check ball 142.

(Specific Structure of Ratchet Element 150 and Ratchet Biasing Spring 160) As shown in FIG. 4, the ratchet element 150 described above has a whole length W which is greater than an outer diameter D thereof. This arrangement permits the ratchet mechanism comprising the plunger 120 and the ratchet element 150 to operate more smoothly by suppressing inclination and preventing biased wear of the ratchet element 150, that is otherwise prone to be caused within the ratchet-receiving hole 113 in the sliding direction, even when an overload is loaded to the ratchet element 150. Further, in order to engage with the rack teeth 122 engraved on the side surface of the plunger 120 by equally dispersing the engaging load, the ratchet element 150 of the present embodiment is provided with the three ratchet teeth 151 having teeth intervals equal with pitches of the rack teeth 122 and the same tooth height with the rack teeth 122 at the edge area on the plunger side thereof as shown in FIGS. 3 and 4.

The ratchet biasing spring 160 described above is inserted concentrically within the ratchet element 150 along the sliding direction as shown in FIG. 4. With this arrangement, the ratchet biasing spring 160 is substantially inserted into A spring-accommodating hole 153 of the ratchet element 150 and as compared with a case of outwardly fitting the ratchet biasing spring 160 around an outer circumferential surface of the ratchet element 150, a configuration for mounting the ratchet element 150 within the ratchet-receiving hole 113 is simplified and downsized.

Then, the biasing force of the ratchet biasing spring 160 is set to be greater than a component force in the sliding direction of the ratchet element 150 caused by the reaction force that is generated from the traveling chain side on starting the engine and sets back the plunger 120 and to be smaller than a component force in the sliding direction of the ratchet element 150 caused by the reaction force that is generated from the traveling chain side and sets back the plunger 120 when tension of the chain is excessive after starting the engine. With this arrangement, it becomes possible to reduce flapping noise of the timing chain by suppressing the setback displacement of the plunger 120 on starting the engine and also to prevent seizure of the plunger 120 by allowing the setback displacement of the plunger 120 when the tension of the timing chain is excessive after starting the engine. This arrangement also requires no special high-load accommodating plunger biasing spring 130, orifice mechanism and oil-reserving mechanism, so that it becomes possible to downsize the tensioner itself by reducing a number of parts and production costs.

Then, the spring stopping washer 170, which is the most characteristic part of the ratchet-type tensioner 100 of the present embodiment, will be explained with reference to FIGS. 4 through 7. (Specific Structure of Spring Stopping Washer 170) That is, as shown in FIG. 4, the spring stopping washer 170 has A C-ring 171 fitted into the rear-end area of the ratchet-receiving hole 113 in a diameter-reduced state and is anchored by enlarging the diameter within A anchoring circumferential groove 113a of the ratchet-receiving hole 113 and A spring stopping piece 172 that extends from the C-ring 171 to a ring center area to seat the ratchet biasing spring 160. With this arrangement, the C-ring 171 of the spring stopping washer whose diameter is enlarged in the radial direction of the ratchet-receiving hole 113 traverse the sliding direction of the ratchet element 150 is positioned and anchored within the anchoring circumferential groove 113a and the spring stopping piece 172 blocks impacts receiving from the ratchet biasing spring 160 without propagating to the C-ring 171.

The spring stopping washer 170 is also provided with diameter-reducing pin holes 174 for drawing both ends of the C-ring 171 each other by diameter-reducing tool pins T at the both ends of the ring, so that it is possible to enlarge/reduce the diameter of the C-ring 171 of the spring stopping washer 170 arbitrarily by the diameter-reducing tool pins T engaged with the diameter-reducing pin engaging holes 174 in assembling the spring stopping washer 170 for example.

Figure 5A:
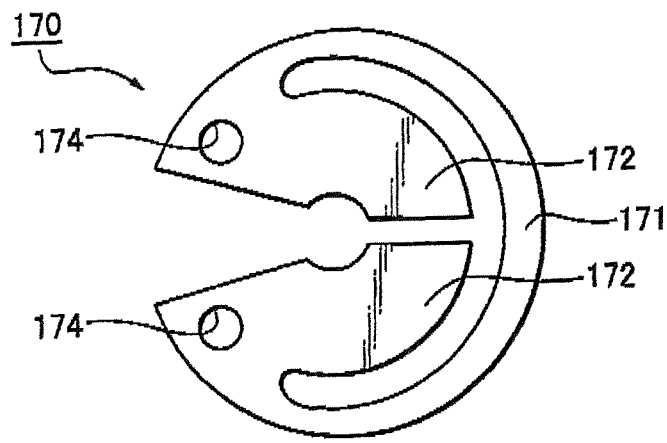
FIG. 5 is an explanatory view illustrating a state just before assembling the spring stopping washer.
Figure 5B:
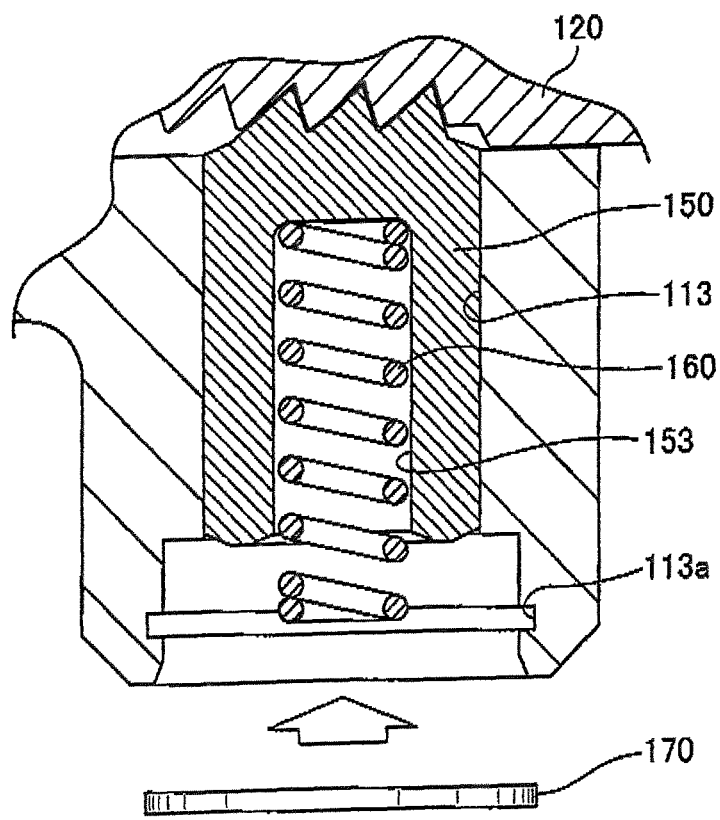
Figure 6A:
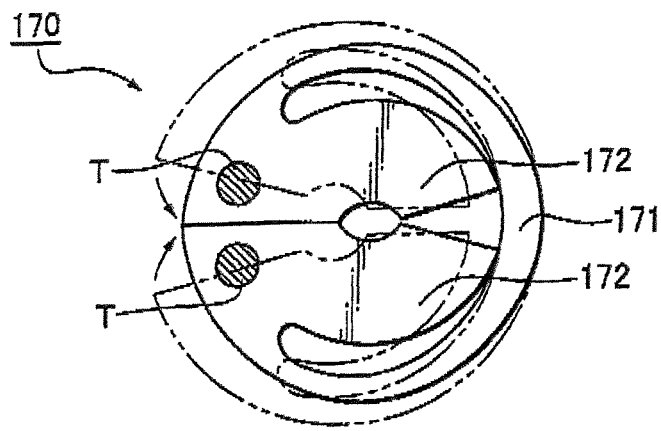
FIG. 6 is an explanatory view illustrating a state during assembling the spring stopping washer.
Figure 6B:
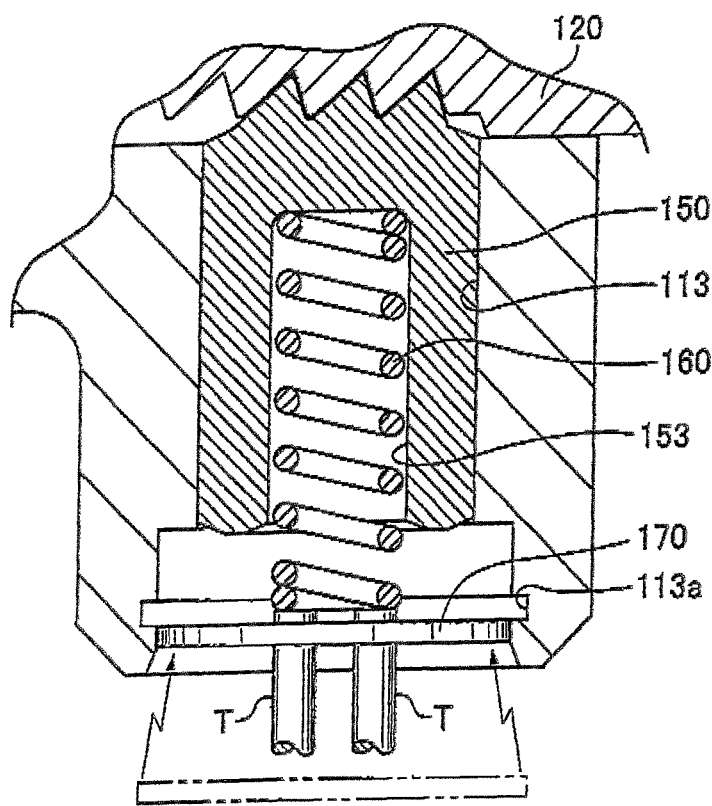

(Assembly of Spring Stopping Washer 170) FIG. 5(a) shows a state of the spring stopping washer 170 when the diameter of the C-ring 171 is enlarged just before it is assembled and FIG. 5(b) shows a state just before when the spring stopping washer 170 is fit into the rear-end area of the ratchet-receiving hole 113. FIG. 6(a) shows a state when the diameter of the C-ring 171 is reduced in assembling the spring stopping washer 170 and FIG. 6(b) shows a state while fitting the spring stopping washer 170 into the rear-end area of the ratchet-receiving hole 113.

Figure 7A:
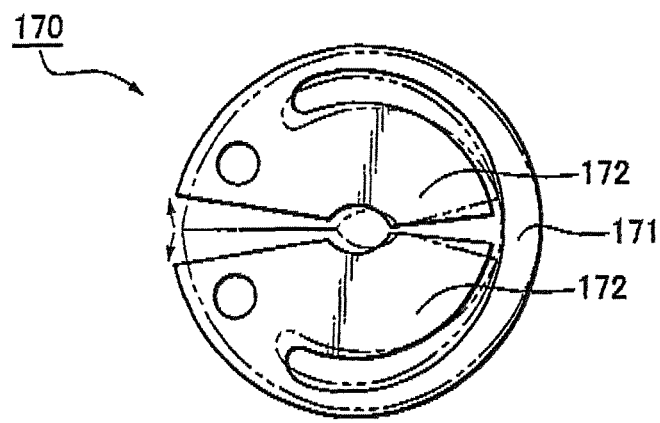
FIG. 7 is an explanatory view illustrating a state just after assembling the spring stopping washer.
Figure 7B:
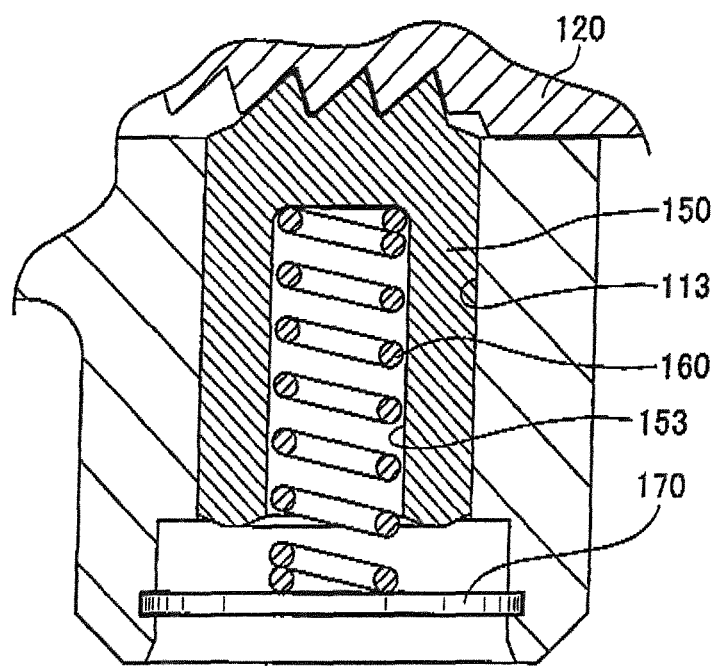

FIG. 7(a) shows a state when the diameter of the C-ring 171 is enlarged after assembling the spring stopping washer 170 and FIG. 7(b) shows a state in which the spring stopping washer 170 is fitted into the rear-end area of the ratchet-receiving hole 113. Therefore, the spring stopping washer 170 of the ratchet-type tensioner 100 of the present embodiment is securely fitted into the rear-end area of the ratchet-receiving hole 113 by starting the assembly works from the state in which the diameter of the C-ring 171 of the spring stopping washer 170 is enlarged as shown in FIG. 5, by fitting the spring stopping washer 170 into the spring-accommodating hole 153a of the spring-accommodating hole 153 while reducing the diameter by drawing the both ends of the C-ring 171 by the diameter-reducing tool pins T engaged with the diameter-reducing pin engaging holes 174 of the C-ring 171 as shown in FIG. 6 and then by engaging the spring stopping washer 170 by enlarging the both ends of the C-ring 171 within the spring-accommodating hole 153a of the spring-accommodating hole 153 as shown in FIG. 7. Note that it is needless to say that the spring stopping washer 170 can be removed by reversing the abovementioned procedures in maintaining the ratchet-type tensioner 100.

(Ratchet Function of Ratchet-type Tensioner 100) The mutual relationship of the rack teeth 122 of the plunger 120 and the ratchet teeth 151 and the ratchet biasing spring 160 of the ratchet element 150, i.e., ratchet functions brought about by them, of the ratchet-type tensioner 100 of the present embodiment will be detailed further with reference to FIGS. 3 and 8 through 12. Firstly, as shown in FIG. 8, always when the plunger 120 projects on starting the engine and during normal operation after starting the engine, f1>Fs and the plunger 120 advances while pushing back the ratchet element 150. Here, the biasing force Fs of the ratchet biasing spring 160 used in the present embodiment is set to be greater than a component force f1 in the sliding direction of the ratchet element 150 caused by a reaction force F1 that acts from the traveling chain side and sets back the plunger 120 on starting the engine as shown in FIG. 9 and to be smaller than a component force f2 in the sliding direction of the ratchet element 150 caused by a reaction force F2 that acts from the traveling chain side and sets back the plunger 120 when the tension of the chain is excessive after starting the engine as shown in FIG. 10.

Due to that, f1>Fs turns out always when the plunger 120 projects on starting the engine as shown in FIG. 8 and advances following a lever (not shown). Then, when the first reaction force F1 that tries to set back the plunger 120 is generated from the traveling chain side on starting the engine as shown in FIG. 9, the biasing force Fs of the ratchet biasing spring 160 which is greater than the component force f1 in the sliding direction of the ratchet element 150 described above acts on the ratchet teeth 151 of the ratchet element 150. Then, the ratchet teeth 151 engage with the rack teeth 122 of the plunger 120, restrict the move in the setback direction of the plunger 120 causing backlash and block a setback displacement of the plunger 120. Further, when a reaction force F2 that sets back the plunger 120 is generated from the traveling chain side when the tension of the chain is excessive after starting the engine as shown in FIG. 10, the component force f2 in the sliding direction of the ratchet element 150 described above becomes greater than the biasing force Fs of the ratchet biasing spring 160. Then, the ratchet teeth 151 of the ratchet element 150 disengage from the rack teeth 122 of the plunger 120 as shown in FIG. 11. Thus the plunger 120 sets back by one tooth or several teeth of the rack teeth 122 until when the reaction force Fs of the ratchet biasing spring 160 becomes relatively greater than the component force f2. Thus, the ratchet-type tensioner 100 is arranged so as not to restrict the move in the setback direction of the plunger 120 causing the backlash due to the excessive tension of the chain after starting the engine and to allow the setback displacement of the plunger 120 as shown in FIG. 12.

Accordingly, a biasing force of the plunger biasing spring 130 is enough if it is greater than biasing force Fs of the ratchet biasing spring 160 and biases and projects the plunger 120. It is then possible to control the disengagement timing caused by the excessive tension of the chain after starting the engine by adjusting the biasing force Fs of the ratchet biasing spring 160 within such range.

More specifically, in the ratchet-type tensioner 100 of the present embodiment, the rack teeth 122 of the plunger 120 are formed concavo-convexly by stop surfaces 122a inclined toward the plunger-advance side with respect to the sliding direction of the ratchet element 150 and sliding surfaces 122b inclined toward the plunger-setback side with respect to the sliding direction of the ratchet element 150 as shown in FIG. 3. The ratchet teeth 151 are formed concavo-convexly by stop counterface surfaces 151a inclined toward the plunger-advance side with respect to the sliding direction of the ratchet element 150 and sliding counterface surfaces 151b inclined toward the plunger-setback side with respect to the sliding direction of the ratchet element 150.

With this arrangement, when the reaction force F2 that sets back the plunger 120 is generated from the traveling chain side when the tension of the chain is excessive after starting the engine as shown in F1G. 10, the reaction force F2 acts on the stop counterface surface 151a of the ratchet element 150 as a component force fh through the stop surface 122a of the plunger side. The component force fh that acts on the stop counterface surface 151a of the ratchet element 150 acts as the further smaller component force f2 in the sliding direction of the ratchet element 150 so that the ratchet teeth 151 of the ratchet element 150 disengage from the rack teeth 122 of the plunger 120. Then, as shown in FIGS. 11 and 12, the rack teeth 122 of the plunger 120 slide over the sliding counterface surface 151b by going over the stop counterface surface 151a of the ratchet element 150 and return by one tooth or several teeth.

Then, an inclination angle θ of the stop surface 122a formed on the plunger 120 described above is set to be smaller than an inclination angle α of the sliding surface 122b. This arrangement blocks the rack teeth 122 of the plunger 120 from disengaging from the ratchet teeth 151 of the ratchet element 150 even when the reaction force F1 that sets back the plunger 120 is generated from the traveling chain side on starting the engine.

Therefore, even when the plunger 120 advances excessively due to temperature change of the engine and others and an overload is generated by backstop as described above, a relationship of magnitudes of the second component force f2 in the sliding direction of the ratchet element 150 caused by the reaction force F2 that is generated from the traveling chain side and sets back the plunger 120 when the tension of the chain is excessive after starting the engine as shown in FIG. 11 and the biasing force Fs of the ratchet biasing spring 160 turns out as follows:

$$f2 = F2 \times \cos\theta \times \sin\theta \times \mu$$

$$f2 > Fs$$

Note that μ here is a coefficient of friction between the rack teeth 122 of the plunger 120 and the ratchet teeth 151 of the ratchet element 150.

When the move in the setback direction of the plunger 120 causing the backlash is restricted to block the setback displacement on starting the engine as described above, a relationship of magnitudes of the component force f1 in the sliding direction of the ratchet element 150 caused by the reaction force F1 that is generated from the traveling chain side and sets back the plunger 120 on starting the engine as shown in FIG. 9 and the biasing force Fs of the ratchet biasing spring 160 turns out as follows:

$$f1 = F1 \times \cos\theta \times \sin\theta \times \mu$$

$$f1 < Fs$$

Note that μ here is the coefficient of friction between the rack teeth 122 of the plunger 120 and the ratchet teeth 151 of the ratchet element 150.

Next, disengagement operations of the rack teeth 122 of the plunger 120 and the ratchet teeth 151 of the ratchet element 150 when the tension of the chain is excessive after starting the engine, which is the most characteristic part of the ratchet-type tensioner 100 of the present embodiment, will be explained with reference to FIGS. 10 through 12. It is noted that an imaginary lines shown at the plunger-front end side in FIGS. 10 and 12 show states when the tension of the chain is excessive after starting the engine, i.e., the frontend position of the plunger 120 in the state shown in FIG. 10. Still more, imaginary lines near the ratchet element in FIGS. 11 and 12 show states when the tension of the chain is excessive after starting the engine, i.e., the position of the ratchet element 150 in the state shown in FIG. 8.

When the reaction force F2 that sets back the plunger 120 is generated from the traveling chain when the tension of the chain is excessive after starting the engine, this reaction force F2 acts on the stop counterface surface 151a of the ratchet element 150 through the stop surface 122a on the plunger side as the component force fh as shown in FIG. 10. The component force fh acting on the stop counterface surface 151a of the ratchet element 150 acts also as a smaller component force f2 in the sliding direction of the ratchet element 150.

When the component force f2 in the sliding direction of the ratchet element 150 described above acts, the plunger 120 starts to set back as the stop surfaces 122a on the plunger side slide over the stop counterface surfaces 151a of the ratchet element side as shown in FIG. 11. Thus, the rack teeth 122 of the plunger 120 disengage from the ratchet teeth 151 of the ratchet element 150.

Next, at the same time when the rack teeth 122 of the plunger 120 disengage from the ratchet teeth 151 of the ratchet element 150, the stop surface 122a on the plunger side start to slide over the sliding counterface surface 151b on the ratchet element side and the plunger 120 continues to set back.

When the plunger 120 continues to set back further as the stop surface 122a on the plunger side start to slide over the sliding counterface surface 151b of the ratchet element side, a succeeding new stop surface 122a of the rack tooth 122 abuts the stop counterface surface 151a of the ratchet element side and allows the setback displacement as shown in FIG. 12. Thus, it becomes possible to release the overload otherwise caused by the excessive projection of the plunger 120 due to the temperature change and others of the engine by returning the plunger 120 by one tooth or several teeth of the rack teeth 122.

The ratchet-type tensioner 100 of the first embodiment of the invention thus obtained is provided with the ratchet biasing spring 160 extendably inserted within the spring-accommodating hole 153 so that it projects partly therefrom, so that it becomes possible to prevent buckling of the ratchet biasing spring 160, to simplify and downsize the attachment of the ratchet element 150 into the ratchet-receiving hole 113 of the housing body 110 and to lighten the ratchet element 150 itself because the ratchet element 150 is hollowed out by the spring-accommodating hole 153.

Still more, because the spring stopping washer 170 has the C-ring 171 fitted in the rear-end area of the ratchet-receiving hole 113 in the diameter-reduced state and the spring stopping piece 172 extending to the ring-center area from the C-ring 171, it becomes possible to prevent the spring stopping washer 170 from falling out to the outside from the anchoring circumferential groove 113a of the ratchet-receiving hole 113 even if the ratchet biasing spring 160 that seats on the spring stopping washer 170 expands and contracts due to sliding actions of the ratchet element 150. Further, because the spring stopping washer 170 is rigidly assembled to the ratchet-receiving hole 113 of the housing body 110 and has the diameter-reducing pin engaging holes 174 respectively on the both sides of the C-ring 171, it becomes easily possible to perform assembly and decomposing operations such as assembly and removal of the spring stopping washer 170 to/from the ratchet-receiving hole 113 of the housing body 110.

Still more, because the rack teeth 122 of the plunger 120 are formed concavo-convexly respectively by the stop surfaces 122a inclined toward the plunger-advance side and the sliding surfaces 122b inclined toward the plunger-setback side, the ratchet teeth 151 of the ratchet element 150 are formed concavo-convexly respectively by the stop counterface surfaces 151a inclined toward the plunger-advance side and the sliding counterface surfaces 151b inclined toward the plunger-setback side, and the inclination angle θ of the stop surface 122a is formed to be smaller than the inclination angle α of the sliding surface 122b, it becomes possible to smoothly allow the setback displacement without restricting the move of the plunger 120 in the setback direction while preventing wear and damage such as chipping of the teeth that is prone to occur in the ratchet teeth 151 and the rack teeth 122 when the tension of the chain is excessive after starting the engine and to exhibit excellent durability by avoiding excessive impact on the ratchet biasing spring 160.

Next, the ratchet-type tensioner of a second embodiment of the invention will be explained with reference to FIGS. 13 through 17.

As compared to the ratchet-type tensioner 100 of the first embodiment described above, the ratchet-type tensioner of the second embodiment of the invention is different in terms of a specific configuration of the spring stopping washer 170 described above and is not different in terms of the other device configurations so that the specific configuration of a spring stopping washer 270 used in the second embodiment of the invention will be detailed with reference to FIGS. 13 through 17. It is noted that the device configurations other than spring stopping washer 270 of the second embodiment of the invention will be denoted by reading the reference numerals in 100's showing the same or corresponding members in the ratchet-type tensioner 100 of the first embodiment described above while replacing with reference numerals in 200's.

That is, as shown in FIG. 13, the spring stopping washer 270 has a C-ring 271 fitted into the rear-end area of the ratchet-receiving hole 213 in a diameter-reduced state and is anchored by enlarging the diameter within an anchoring circumferential groove 213a of the ratchet-receiving hole 113 and a spring stopping piece 272 that extends from the C-ring 271 to a ring center area to seat the ratchet biasing spring 260. With this arrangement, the C-ring 271 of the spring stopping washer whose diameter is enlarged in the radial direction of the ratchet-receiving hole 213 traverse the sliding direction of the ratchet element 250 is positioned and anchored within the anchoring circumferential groove 213a of the ratchet-receiving hole 213 and the spring stopping piece 272 blocks impacts receiving from the ratchet biasing spring 260 without propagating to the C-ring 271.

Here, as shown in FIG. 14, the spring stopping surface 272 described above is integrally formed with the C-ring 271 through an intermediary of A narrow neck-like link portion 273 that rises toward the ratchet biasing spring 260 from the C-ring 271. With this arrangement, the spring stopping piece 272 exhibits resilience against the repetitive load from the ratchet biasing spring 260 by the rise of the spring stopping piece 272 from the C-ring 271 through the spring stopping piece 272.

Still more, the spring stopping piece 272 is held by the narrow neck-like link portion 273 and the both ends of the C-ring 271 while overlapping with the both ends of the C-ring 271 at the rear-end area of the ratchet-receiving hole 213. With this arrangement, the spring stopping piece 272 is supported by the both of the narrow neck-like link portion 273 and the both ends of the C-ring 271, so that it is possible to avoid bending stress otherwise applied to the narrow neck-like link portion 273 by the repetitive loads from the ratchet biasing spring 260.

The spring stopping washer 270 described above also is provided with diameter-reducing pin holes 274 for drawing the both ends of the C-ring 271 each other by the diameter-reducing tool pins T at the both ends of the ring.

With this arrangement, it is possible to enlarge/reduce the diameter of the C-ring 271 of the spring stopping washer 270 arbitrarily by the diameter-reducing tool pins T engaged with the diameter-reducing pin engaging holes 274 in assembling the spring stopping washer 270 for example.

According to the ratchet-type tensioner 200 of the second embodiment thus obtained, because the ratchet biasing spring 260 is inserted into and attached within the spring-accommodating hole 253 of the ratchet element 250 while extendably projecting the part thereof out of the spring-accommodating hole 253 in the sliding direction of the ratchet element 250, it is possible to prevent the buckling of the ratchet biasing spring 260, to simplify and downsize the configuration for attaching the ratchet element 250 to the ratchet-receiving hole 213 of the housing body 210 and to lighten the ratchet element 250 itself because the ratchet element 250 is hollowed out by the spring-accommodating hole 253.

Still more, because the spring stopping washer 270 has the C-ring 271 fitted in the rear-end area of the ratchet-receiving hole 213 in the diameter-reduced state and the spring stopping piece 272 extending to the ring-center area from the C-ring 271, it becomes possible to prevent the spring stopping washer 270 from falling out to the outside from the anchoring circumferential groove 213a of the ratchet-receiving hole 213 even if the ratchet biasing spring 260 that seats on the spring stopping washer 270 expands and contracts due to sliding actions of the ratchet element 250. Further, because the spring stopping washer 270 is rigidly assembled to the ratchet-receiving hole 213 of the housing body 210 and has the diameter-reducing pin engaging holes 274 respectively on the both sides of the C-ring 271, it becomes easily possible to perform assembly and decomposing operations such as assembly and removal of the spring stopping washer 270 to/from the ratchet-receiving hole 213 of the housing body 210.

Still more, because the spring stopping piece 272 described above is integrally formed with the C-ring 271 through the intermediary of the narrow neck-like link portion 273 that rises toward the ratchet biasing spring 260 from the C-ring 271, it is possible to securely seat the ratchet biasing spring 260, that extends and contracts due to the projecting/receding actions of the ratchet element 250, on the spring stopping piece 272. Still more, because the spring stopping piece 272 is held by the narrow neck-like link portion 273 and the both ends of the C-ring 271 while overlapping with the both ends of the C-ring 271 at the rear-end area of the ratchet-receiving hole 213, the spring stopping washer 270 can exhibit excellent strength and durability to the repetitive loads from the ratchet biasing spring 260.

Still more, according to the second embodiment, because the rack teeth 222 of the plunger 220 are formed concavo-convexly respectively by the stop surfaces 222a inclined toward the plunger-advance side and the sliding surfaces 222b inclined toward the plunger-setback side, the ratchet teeth 251 of the ratchet element 250 are formed concavo-convexly respectively by the stop counterface surfaces 251a inclined toward the plunger-advance side and the sliding counterface surfaces 251b inclined toward the plunger-setback side, and the inclination angle θ of the stop counterface surface 251a is formed to be smaller than the inclination angle α of the sliding counterface surface 251b, it becomes possible to smoothly allow the setback displacement without restricting the move of the plunger 220 in the setback direction while preventing wear and damage such as chipping of the teeth that is prone to occur in the ratchet teeth 251 and the rack teeth 222 when the tension of the chain is excessive after starting the engine and to exhibit excellent durability by avoiding excessive impact on the ratchet biasing spring 260. Thus, the effects of the ratchet-type tensioner of the second embodiment are remarkable.

DESCRIPTION OF REFERENCE NUMERALS 100, 200 ratchet-type tensioner
110, 210 housing body
111, 211 oil supplying passage
112, 212 plunger-accommodating hole 113, 213 ratchet-receiving hole
113a, 213a anchoring circumferential groove
114, 214 pin-inserting hole
120, 220 plunger
121, 221 hollow portion
122, 222 rack teeth
122a stop surface
122b sliding surface
130, 230 plunger biasing spring
140, 240 check valve unit
141, 241 ball seat
141a, 241a oil passage
141b, 241b valve seat
142, 242 check ball
143, 243 ball biasing spring
144, 244 bell-like retainer
150, 250 ratchet element
151, 251 ratchet tooth
151a stop counterface surface
151b sliding counterface surface
153, 253 spring accommodating hole
160, 260 ratchet biasing spring
170, 270 spring stopping washer
171, 271 C-ring
172, 272 spring stopping piece
273 narrow neck-like link portion
174, 274 diameter-reducing pin engaging hole
S1 driving sprocket
S2 driven sprocket
C timing chain
L movable lever
G stationary guide
P piston-section high-pressure oil chamber
R high-pressure oil chamber
D ratchet outer diameter
W ratchet whole length
Fs biasing force of ratchet biasing spring
F1 reaction force setting back plunger on starting engine
F2 reaction force setting back plunger when tension of chain is excessive after starting engine
f1 component force in sliding direction of ratchet caused by reaction force F1
f2 component force in sliding direction of ratchet caused by reaction force F2
fh component force acting on stop surface of plunger by reaction force F2
θ inclination angle of stop surface formed on plunger
α inclination angle of sliding surface formed on plunger
T diameter-reducing tool pin
500 prior art ratchet-type tensioner
512 housing
514 plunger
516 oil chamber
518 spring
520 oil sub-chamber
524 rod
526 piston
528 air chamber
530 cap
532 air communicating hole
534 second spring
536 engagement teeth
538 rack
544 oil passage
548 oil passage
550 oil reservoir

The invention claimed is:

1. A ratchet-type tensioner, comprising:
a housing body in which an oil passage for supplying external pressure oil is formed;
a plunger-accommodating hole formed in the housing body;
a plunger projecting out of the plunger-accommodating hole toward a traveling chain, and slidable in said plunger-accommodating hole in an advance/setback direction;
a high-pressure oil chamber formed between the plunger-accommodating hole of said housing body and a hollow portion of the plunger;
a plunger biasing spring accommodated in the high-pressure oil chamber to bias the plunger in a plunger projection direction;
a ratchet-receiving hole formed within said housing, said ratchet-receiving hole having a front end adjacent said plunger-accommodating hole and a rear end remote from said plunger-accommodating hole;
a columnar ratchet element fittingly inserted into the ratchet-receiving hole and sliding in a direction transverse to said advance/setback direction of the plunger;
ratchet teeth provided at a plunger-side front-end area of the ratchet element;
a ratchet biasing spring for biasing the ratchet teeth toward rack teeth provided on a side surface of the plunger; and
a spring stopping washer fitted into said ratchet-receiving hole at a location adjacent said rear end of said ratchet-receiving hole to seat the ratchet biasing spring;
characterized in that
said ratchet biasing spring is inserted and attached within a spring-accommodating hole provided within said ratchet element, said spring being extendible in a sliding direction of the ratchet element as the ratchet element moves in a direction in which the ratchet element projects out of the spring-accommodating hole;
said ratchet-receiving hole is defined by a wall having a diameter, and has a circumferential groove formed in said wall at a location adjacent said rear end thereof;
said spring stopping washer comprises a resilient C-ring having opposed free ends, said C-ring being capable of being reduced to a diameter smaller than the diameter of said wall of the ratchet-receiving hole by drawing said free ends toward each, and being resiliently expansible to a larger diameter greater than the diameter of said wall, said C-ring being anchored at said location adjacent said rear end of said ratchet-receiving hole by fitting into said circumferential groove, and said spring stopping washer also comprises a spring stopping piece, located centrally within said ratchet-receiving hole and offset from said C-ring toward said front end of the ratchet-receiving hole, to seat the ratchet biasing spring, and a narrow neck-shaped connecting portion, unitary with said spring stopping piece and said C-ring, connecting said spring stopping piece to the C-ring, said narrow-neck-shaped connecting portion extending obliquely with reference to said sliding direction of the ratchet element, both inward toward a central location within said ratchet-receiving hole and forward toward said front end of the ratchet-receiving hole, from an intermediate location on the C-ring between said free ends of the C-ring to the spring stopping piece; and
said spring stopping piece overlaps both of said free ends of the C-ring by extending in directions transverse to said sliding direction of the ratchet element, and is engageable with both free ends of the C-ring by movement of said spring stopping piece in said sliding direction of the ratchet element upon deflection of said narrow neck-shaped connecting portion, the extent of the overlap of the stopping piece with the free ends of the C-ring, when the C-ring is fitted into said circumferential groove, being sufficient that the spring stopping piece can be supported both by said narrow neck-shaped connecting portion and by engagement of overlapping parts of the spring stopping piece with parts of the free ends of the C-ring.

2. The ratchet-type tensioner according to claim 1, characterized in that said spring stopping washer is provided with diameter-reducing pin engaging holes respectively adjacent both free ends of said C-ring to reduce the diameter of said C-ring by drawing both said free ends of said C-ring toward each other by means of diameter-reducing tool pins.

3. The ratchet-type tensioner according to claim 1, characterized in that the biasing force of said ratchet biasing spring is set to be greater than a component force in the sliding direction of the ratchet element caused by the reaction force that is generated from the traveling chain side and sets back the plunger on starting the engine, and to be smaller than a component force in the sliding direction of the ratchet element caused by the reaction force that is generated from the traveling chain side and sets back the plunger when tension of the chain is excessive after starting the engine.

4. The ratchet-type tensioner according to claim 1, characterized in that the rack teeth of said plunger are formed concave-convexly respectively by the stop surfaces inclined toward the plunger-advancing side with respect to the sliding direction of said ratchet element and the sliding surfaces inclined toward the plunger-setback side with respect to the sliding direction of said ratchet element; and the ratchet teeth of said ratchet element are formed concavo-convexly respectively by the stop counterface surfaces inclined toward the advance-direction side with respect to the sliding direction of said ratchet element and the sliding counterface surfaces inclined toward the plunger-setback side with respect to the sliding direction of said ratchet element.

5. The ratchet-type tensioner according to claim 1, characterized in that the inclination angle of said stop surface is set to be smaller than the inclination angle of said sliding surface.

6. The ratchet-type tensioner according to claim 1, characterized in that the length of said ratchet element is greater than the diameter of said wall of the ratchet-receiving hole.

\* \* \* \* \*